US010343846B2

(12) United States Patent
Reeser et al.

(10) Patent No.: US 10,343,846 B2
(45) Date of Patent: Jul. 9, 2019

(54) VIBRATORY FEEDER DRIVE

(71) Applicant: PPM TECHNOLOGIES HOLDINGS, LLC, Newberg, OR (US)

(72) Inventors: Devin Ray Reeser, Portland, OR (US); Eric Jason Doern, Sherwood, OR (US)

(73) Assignee: PPM Technologies Holdings, LLC, Newberg, OR (US)

( * ) Notice: Subject to any disclaimer, the term of this patent is extended or adjusted under 35 U.S.C. 154(b) by 0 days.

(21) Appl. No.: 15/675,603

(22) Filed: Aug. 11, 2017

(65) Prior Publication Data

US 2018/0044115 A1 Feb. 15, 2018

Related U.S. Application Data

(60) Provisional application No. 62/374,393, filed on Aug. 12, 2016.

(51) Int. Cl.
*B65G 27/24* (2006.01)
*B65G 27/08* (2006.01)
*B65G 27/04* (2006.01)

(52) U.S. Cl.
CPC .............. *B65G 27/24* (2013.01); *B65G 27/04* (2013.01); *B65G 27/08* (2013.01); *B65G 2812/0308* (2013.01)

(58) Field of Classification Search
CPC ........ B65G 27/04; B65G 27/08; B65G 27/24; B65G 2812/0308
USPC .......................................................... 198/769
See application file for complete search history.

(56) References Cited

U.S. PATENT DOCUMENTS

| 4,719,376 | A | * | 1/1988 | Dean | ...................... H02K 33/12 310/29 |
| 5,287,027 | A | * | 2/1994 | Marshall | ................. B06B 1/045 198/769 |
| 5,293,987 | A | * | 3/1994 | Marshall | ................ B65G 27/08 198/769 |
| 6,107,715 | A | * | 8/2000 | Patterson | ............... B65G 27/08 310/17 |
| 6,201,330 | B1| * | 3/2001 | Patterson | ............... B65G 27/32 198/769 |

* cited by examiner

*Primary Examiner* — Gene O Crawford
*Assistant Examiner* — Keith R Campbell
(74) *Attorney, Agent, or Firm* — McCoy Russell LLP

(57) ABSTRACT

An electromagnetic drive mechanism for use in powering vibratory equipment is provided. As one example, a drive mechanism may include a plurality of deflectable elastomeric springs in a configuration that allows the auxiliary springs to achieve a vertical, non-linear spring rate increase.

19 Claims, 10 Drawing Sheets

VIBRATORY FEEDER DRIVE

CROSS REFERENCE TO RELATED APPLICATIONS

The present application claims priority to U.S. Provisional Application No. 62/374,393, entitled "VIBRATORY FEEDER DRIVE," filed on Aug. 12, 2016, the entire contents of which are hereby incorporated by reference for all purposes.

FIELD

The present disclosure relates to devices such as vibratory conveyors, including excitable vibratory conveyors and/or the drive mechanism resulting in the vibratory motion of such conveyors.

BACKGROUND AND SUMMARY

Vibratory conveyors may be used in a wide variety of industries for transportation of bulk materials or small parts. Additionally, some vibratory conveyors may be used to perform processing operations such as screening, transferring, heating, cooling, and other such processing operations on bulk materials such as food products, sand, gravel, foundry parts, or the like.

The inventors herein have identified some shortcomings in some vibratory conveyor applications, particularly those applications with relatively large conveyors utilizing relatively large vibratory drives. As one example, the motion of the drive mechanism may lead to an increased likelihood of degradation of the mass/spring systems used in the drive mechanism to generate the vibratory driving force. Replacing such components may present further complications. As an example, the mass/spring systems may be difficult to access and demand that a user to at least partially disassemble the conveyor system to replace the drive mechanism. This may be due to the assembly of previous drive mechanisms, wherein two or more of the springs, armature, drive weights, and electromagnetic coil are mounted via a shared piece. This in combination with a mounting of the drive mechanism to a conveyor pan and/or conveyor trough may result in accessing the various components of the drive mechanism difficult. For example, multiple people may be needed to lift the conveyor trough and/or pan to dissemble the drive mechanism, where dissembling the drive mechanism includes removing one or more mounts corresponding to two or more of the springs, armature, drive weights, and electromagnetic coil. This may reduce efficiency and increase costs.

In one example, the issues described above may be solved by a system for an electromagnetic drive mechanism comprising a first drive weight aligned with and in face-sharing contact with a second drive weight, a top clamp and a bottom clamp fixedly coupling the first and second drive weights together, springs arranged alongside the first and second drive weights, a tie plate coupling the springs to the first and second drive weights, and a coil slidably mounted on a coil housing, the coil being configured to oscillate between the coil housing and the first and second drive weights. In this way, the electromagnetic drive mechanism may allow a user to access each of the springs, first drive weight, second drive weight, and coil individually.

As one example, the first drive weight and the second drive weight are mounted in the electromagnetic drive mechanism via the top and bottom clamps and the tie plate. In one example, the tie plate is only coupled to one of the first drive weight or the second drive weight. The first drive weight and the second drive weight may be mounted such that they are immovable during an operation of the electromagnetic drive mechanism. The springs may be arranged on opposite longitudinal sides of each of the drive weights. By doing this, each of the first and second drive weights may be flanked by a group of springs. The springs may be segmented such that each springs of the group of springs operating independently. In one example, the springs are coupled to a mount angle, where there are two mount angles, each corresponding to a longitudinal side of the drive weights. The coil may be arranged on a lateral side of the drive weights where the coil may move to and away from the drive weights based on its energization. The coil housing may be mounted via a coil housing mount, where the coil housing mount may be coupled to one or more components of the conveyor. Additionally or alternatively, the mount angles may be coupled to one or more components of the conveyor. By doing this, a motion of the coil and one or more of the springs may be imparted onto the conveyor and translated into vibratory and/or linear motion of the conveyor. This in combination with the mounting of the springs, coil, and drive weights described above provides an easily accessible electromagnetic drive mechanism configured to drive a conveying system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-13 are drawn to scale, although other relative dimensions may be used.

DETAILED DESCRIPTION

Figure 1:
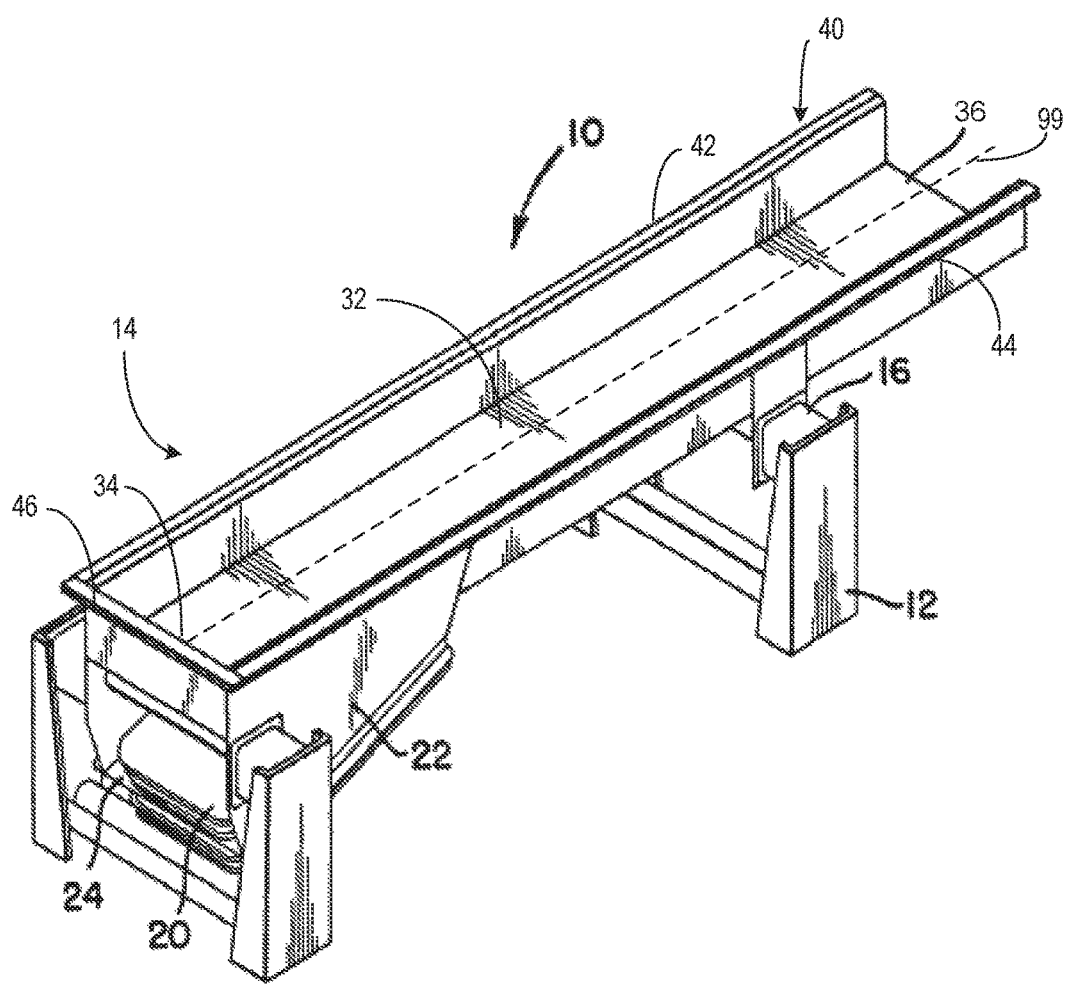
FIG. 1 is a simplified drawing of a conveyor showing the environment of the drive.

The present disclosure will now be described more fully hereinafter with reference to the accompanying drawings, in which exemplary embodiments of the present disclosure are shown. The particular embodiments are merely exemplary in nature, and in no way are intended to limit the scope of the present disclosure, its application, or uses, which may, of course, vary. The examples are described with relation to the non-limiting definitions and terminology included herein. These definitions and terminologies are not designed to function as a limitation on the scope or practice of the present disclosure but are presented for illustrative and descriptive purposes only. While the processes or compositions are described as an order of individual steps, or using specific materials, it is appreciated that steps or materials may be interchanged such that the description of the present disclosure may include multiple parts or steps arranged in many different ways.

Components, process steps, and other elements that may be substantially the same in one or more embodiments are identified coordinately and are described with minimal repetition. It will be noted however, that elements identified coordinately may also differ to some degree.

The terminology as used herein is for the purposes of describing particular embodiments only and is not intended to be limiting. As used herein, the singular forms "a", "an", and "the" are intended to include the plural forms, including "at least one", unless the content clearly indicates otherwise. The term "or" as used herein will be understood to include "and/or." Additionally, as used herein, "and/or" may include any and all combinations of one or more of the associated listed items. It will be further understood that the terms "comprises" and/or "comprising", or "includes" and/or "including", when used in this specification specify the presence of stated features, regions, integers, steps, operations, elements, and/or components, but do not preclude the presence or addition of one or more other features, regions, integers, steps, operations, elements, components, and/or groups thereof. The term "or a combination thereof" or the term "a mixture of" refers to a combination including at least one of the foregoing elements.

Unless otherwise defined, all terms (including technical and scientific terms) used herein have the same meaning as is commonly understood by one of at least ordinary skill in the art to which this disclosure belongs. It will be further understood that terms such as those defined in commonly used dictionaries should be interpreted as having the meaning that is consistent with their meaning in the context of the relevant art and the present disclosure, and will not be interpreted in an idealized or overly formal sense unless expressly so defined herein.

The following detailed description relates to systems and devices for imparting vibratory motion to a vibratory motion utilizing device such as a conveyor system. As one example, a self-contained electromagnetic drive mechanism comprising a center plate, one or more armatures disposed on the center plate, one or more inner drive weights disposed on the center plate, one or more inner auxiliary springs disposed on the center plate, an electromagnet coupled to a mounting bracket disposed on the center plate, one or more constant springs fixedly attached to the center plate, one or more bolt rings fixedly attached to the one or more constant springs, a top plate, and a bottom plate may be provided. In another embodiment, one or more drive weights, an electromagnet, a top plate, and a bottom plate may bolt together and may be coupled to the center plate via one or more inner auxiliary springs.

As another example embodiment, an electromagnetic drive mechanism comprising one or more drive weights, one or more clamp plates which selectively retain the one or more drive weights, one or more auxiliary springs disposed along one or more lateral longitudinal faces of the one or more drive weights, one or more mount angles selectively retaining the one or more auxiliary springs along a lateral face thereof, a mount angle tie bar releasably coupled to an anterior lateral face of the one or more drive weights, an electromagnet releasably coupled to the one or more auxiliary springs at a posterior lateral face and a mounting bracket that selectively retains the electromagnet at a posterior face may also be provided.

It will be appreciated that the second provided exemplary embodiment may allow for improved serviceability and may reduce the amount of time and/or effort associated with removal of the drive. Specifically, the second embodiment may provide an electromagnetic drive in which each component may be removed separately, without necessarily requiring removal of other components in one example. In this way, the overall longevity of the drive may be improved. For example, since springs are typically the components of drive mechanisms which may wear or degrade the fastest, the second example embodiment may provide a drive mechanism in which the springs may be positioned on an exterior lateral face of the drive such that a spring or a plurality of springs may be removed and/or replaced without requiring the removal of the drive assembly. Self-contained springs which may be positioned on an exterior surface or perimeter of the electromagnetic drive as well as springs which may be separately removed from the electromagnetic drive are referred to herein as "auxiliary springs." In using auxiliary springs, the electromagnetic drive may be serviced more easily and the time associated with repairs and/or servicing may be further reduced. The auxiliary springs may be linear or non-linear.

Said another way, the present disclosure describes the second embodiment in detail, where the second embodiment remedies shortcomings identified by the inventors in the first embodiment of the drive mechanism. Specifically, the second embodiment includes a drive mechanism with components mounted independently of a conveyor surface and/or conveyor pan, and where the drive mechanism further includes individually mounted springs or the like. The drive mechanism of the second embodiment and the components thereof are more easily accessed relative to the drive mechanism of the first embodiment due to the mounting described below. The drive mechanisms may drive a vibratory conveyor, belt-type conveyor, other types of conveyors, shakers, or the like.

Disclosed herein is a multi-component electromagnetic drive for providing vibratory motion to a conveyor system. In an embodiment, an electromagnetic drive may be provided in which the individual components of the drive may be mounted independently thereby improving the ease of removal and/or improving the drive's serviceability. In the embodiment or another embodiment, a self-contained drive may include a plurality of auxiliary springs that may comprise elastomeric and metal laminations of different dimensions that may be situated such that sequential contact is effectuated. The provided auxiliary springs may further comprise a non-linear elastomeric spring element in which the force of the auxiliary springs increases as the stroke of the electromagnet increases.

In one example, an electromagnetic drive for use in generating vibratory motion comprises a coil mounted at one end of the drive, a plurality of auxiliary spring elements mounted along two side edge perimeters of the drive, a centrally positioned drive weight, and clamp plates to enable the auxiliary springs to be removed without removing the drive from the conveyor. The clamp plates may couple the springs to the drive weight. In one example, the springs are located adjacent the drive weight. The electromagnetic drive may further comprise a coil mount bracket for mounting the coil into a conveyor pan, wherein the coil is mounted so that it is removable without removing the pan or drive. The drive may further comprise an angled bracket providing a connection between the conveyor and the auxiliary springs and integrating the drive into the conveyor pan.

As illustrated in FIG. 1, a conveyor system 10 is provided. The conveyor system 10 may comprise a conveyor trough 14 which may be mounted through vibration isolators 16 to a plurality of legs 12.

The conveyor system 10 of FIG. 1, in at least one embodiment, may comprise a trough having a substantially U-shaped profile with a length of eight to ten feet. The u-shape of the conveyor trough 14 may be resultant from at least one bend in a metallic sheet at a predetermined location such that when constructed, the trough may comprise one or more walls, wherein a width of ten to twelve inches is exhibited by a planar surface of the trough that is parallel to a ground surface.

Specifically, the conveyor trough 14 comprises a surface 32 upon which items may be conveyed. The surface 32 may be arranged substantially parallel to a ground upon which the plurality of legs 12 may rest. In one example, the surface 32 may be adjusted at an upstream end 34 such that a longitudinal axis 99 of the surface 32 is angled to the ground. Additionally or alternatively, a downstream end 36 of the surface 32 may be adjusted without departing from the scope of the present disclosure. In one example, the upstream end 34 is 8-10 feet away from the downstream end 36.

The conveyor trough 14 may further comprise one or more walls 40 surrounding at least a portion of a perimeter of the surface 32. Specifically, there is a first wall 42, a second wall 44, and a third wall 46. Each of the walls of the walls 40 may be substantially rectangular and smooth. The walls 40 extend upwardly, away from the ground and perpendicular to a plane of the surface 32.

The first wall 42 and the second wall 44 traverse an entire length of the surface 32 from its upstream end 34 to its downstream end 36. A plane of the first 42 and second 44 walls is substantially parallel to the longitudinal axis 99. The first 42 and second 44 walls are arranged along opposite longitudinal edges of the surface 32. In one example, the first 42 and second 44 walls are substantially identical.

The third wall 46 is located between the first 42 and second 44 walls adjacent to the upstream end 34 of the surface 32. A first edge of the third wall 46 is physically coupled to an upstream edge of the first wall 42. Similarly, a second edge of the third wall 46, opposite the first edge, is physically coupled to an upstream edge of the second wall 44. A length of the third wall 46, measured between its first and second edges, may correspond to a width of the surface 32, and a distance between the first 42 and second 44 walls.

In this way, only the downstream end 36 does not comprise a wall of the walls 40. As such, the conveyor trough 14 may feed items along its longitudinal axis 99 toward the downstream end 36, where the items are delivered to another device (e.g., conveyor, weight station, packaging apparatus, or the like). Conveyance of items along the surface 32 of the conveyor trough 14 will be described in greater detail below.

In at least one embodiment, the conveyor system 10 may feed products such as food products, and particularly lightweight products such as snack foods, cereals, and other similarly sized and low density products from its upstream end 34 to its downstream end 36. In one example, when the conveyor system 10 is conveying items and/or products, the surface 32 is arranged between the ground and the items and/or products. In still other embodiments, the conveyor may be configured to transport a plurality of products having a variety of densities and comprising a variety of materials. For example, an exemplary embodiment of the present disclosure may be configured to transport a variety of different products having various densities and other physical characteristics.

Large "grizzly" type conveyors, typically used for coal handling and dewatering equipment, are example vibratory motion conveyors that may benefit in some way from the inclusion or use of the disclosed feeder drive. Additionally, medium sized vibratory motion conveyor systems for use in mines, cement plants, glass production facilities, and the like may also benefit from the inclusion of a feeder drive according to the present disclosure.

The inclusion of the walls 40 may limit motion of items being conveyed away from the longitudinal axis 99. Said another way, the walls 40 may prevent and/or limit items falling off ends of the surface 32 other than the downstream end 36.

The conveyor of FIG. 1 may include an electromagnetic drive mechanism 20 which may be attached to one or more wing plates 22 provided along at least one of the first 42 and/or second 44 walls. As noted briefly above, the side wall projections of the trough 14 may be constructed via a process of bending a metal sheet at two preselected points such that the bends result in a perpendicular projection of the metal sheet upward, away from, and relative to a ground plane. In this way, a u-shaped profile of the trough 14 may be provided. The u-shaped profile may serve to prevent or limit motion of the products to be used with the conveyor system to be contained within the trough.

In some embodiments, the wing plates 22 may be formed integrally with the trough 14. In such embodiments, the attachment of the drive mechanism 20 may be facilitated by bolting the drive mechanism 20 through a center plate 24 of the drive mechanism to the one or more wing plates 22.

The wing plates 22, center plate 24, and drive mechanism 20 may not come into contact with items and/or products being conveyed or resting atop the surface 32 of the conveyor trough 14. As such, only the first wall 42, the second wall 44, the third wall 46, and the surface 32 contact items and/or products when the items and/or products are in the conveyor trough 14.

The drive mechanism 20 may actuate one or more of the wing plates 22, the center plate 24, and the conveyor trough 14. In one example, the drive mechanism 20 is fixedly mounted to one or more of the center plate 24 and the wing plates 22, while being in physical contact but not physically coupled to the conveyor trough. This may allow the drive mechanism 20 to transfer motion from itself to the conveyor trough 14.

As an example, the conveyor trough 14 of the conveyor system 10 may oscillate along the longitudinal axis 99 in first and second directions via the drive mechanism 20, where the first direction is toward the downstream end 36 and the second direction is toward the upstream end 34. The oscillation may include pulsing and/or actuating the conveyor trough 14 at a first speed in the first direction and a second speed in the second direction. Depending on a desired direction of item conveyance, the first speed and the second speed are unequal, where items are conveyed in the direction corresponding to the greater of the two speeds. For example, if the first speed is greater than the second speed, then items are conveyed in the first direction toward the downstream end 36. Oppositely, if the second speed is greater than the first speed, then items are conveyed in the second direction toward the upstream end 34.

As a difference between the first and second speeds increases, a rate of conveyance may proportionally increase. For example, if the difference between the first speed and the second speed increases by 10%, then the rate of conveyance may increase by 10%. In some examples, it may be desired to reduce an impact imparted onto items being conveyed. To decrease an impact imparted onto the items, the difference between the first and second speeds may be reduced. While this may decrease the rate of conveyance, items may be conveyed along the conveyor system with minimal impact. This may be desired when conveying snack foods (e.g., potato chips) along the conveyor system.

Figure 2:
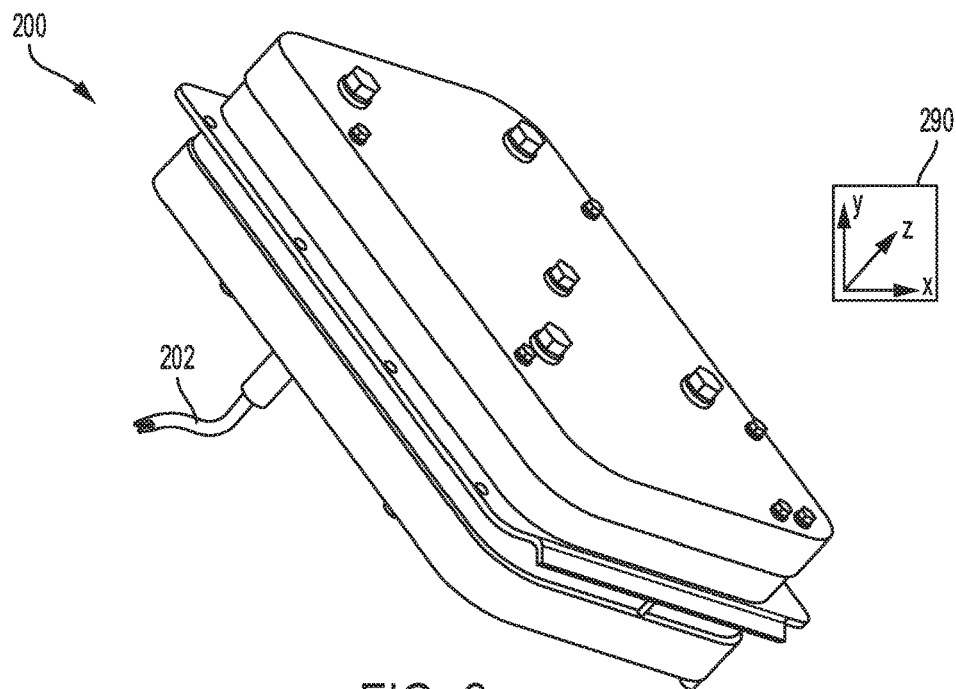
FIG. 2 shows an isometric view of a first electromagnetic drive embodiment.
Figure 3:
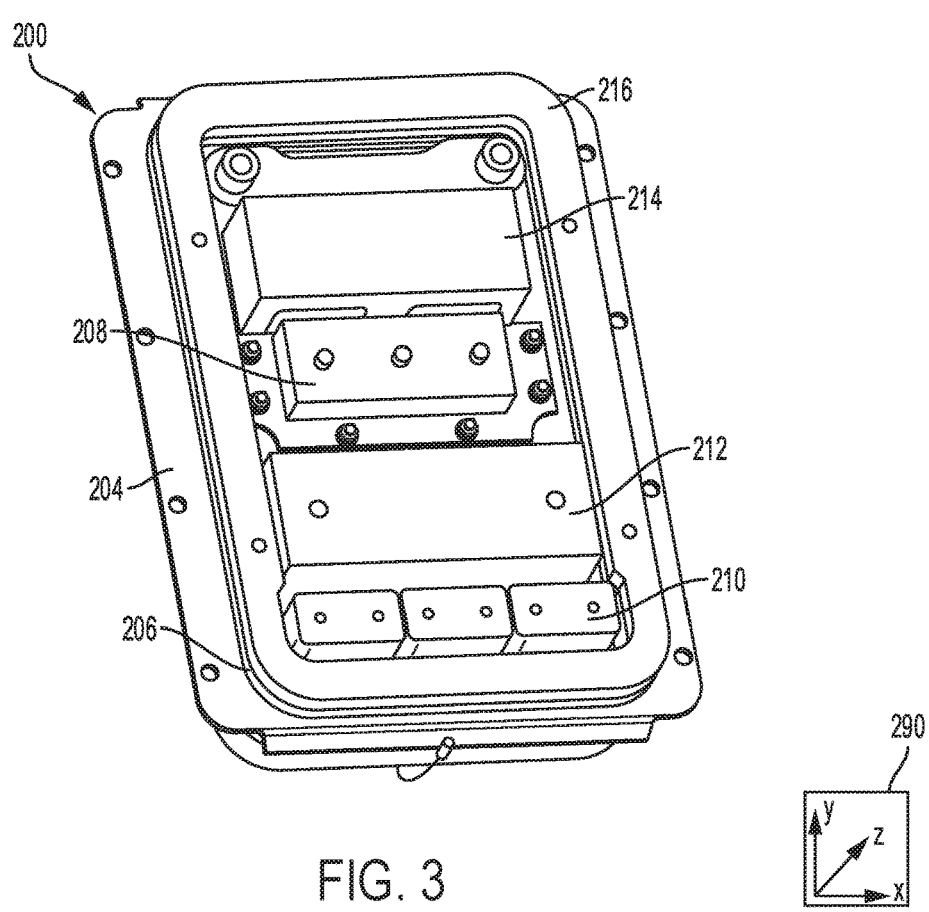
FIG. 3 shows a partially deconstructed view of the first electromagnetic drive embodiment.

As one example, a first example of an electromagnetic drive mechanism 200 is provided in FIGS. 2-3, which may be used as the drive mechanism 20. However, the drive mechanism 200 is mounted to the conveyor trough 14 and/or a conveyor pan. As such, access to the drive mechanism 200 is prohibited until the conveyor trough 14 and/or a conveyor pan is removed.

The electromagnetic drive mechanism 200 may comprise a top plate, an upper bolt ring, an upper constant spring, a center plate, a lower constant spring, a lower bolt ring, and a bottom plate defining the exterior profile of the electromagnetic drive mechanism. Further, the first exemplary embodiment may comprise an electromagnet (also referred to herein as an electromagnetic coil), an armature, one or more inner drive weights, and one or more inner auxiliary springs that may be disposed along an interior portion of the drive mechanism 200 defined by the top plate, the bottom plate, and the structural components disposed therebetween.

The following figures (FIGS. 2-3) describe a first embodiment of an electromagnetic drive mechanism configured to drive a conveyor. Specifically, the first embodiment of the electromagnetic drive mechanism is configured to drive a conveyor of the vibratory type.

The electromagnetic drive mechanism 200 is connected to one or more of a center plate and/or wing plates of a conveyor system (e.g., center plate 24 and wing plates 22 of the conveyor system 10 of FIG. 1) at a first end. A conveyor trough (e.g., conveyor trough 14 of FIG. 1) is physically coupled to a second end, opposite the first end, of the drive mechanism 200 via a mounting bracket or the like. These connections may include bolts, welds, fusions, adhesives, and/or the like. One or more weights and/or vibratory isolators may be mounted onto a trough and/or a pan of the conveyor system (e.g., conveyor trough 14 of conveyor system 10).

The electromagnetic drive mechanism 200 may further comprise one or more armatures (e.g., armature 208 of FIG. 3). When the electromagnetic drive mechanism is activated via a controller, extreme ends of the one or more armatures may move back and forth along a longitudinal axis (e.g., longitudinal axis 99 of FIG. 1). This may be accomplished via one or more electromagnets arranged on opposite sides of the armature(s). The conveyor trough moves linearly with the motion of the armatures due to the physical coupling between the trough and the drive mechanism 200. The electromagnetic drive mechanism 200 further comprises one or more individually mounted spring members which may be configured to assist the electromagnetic drive mechanism 200 in vibrating and/or oscillating the conveyor trough. For example, the springs may store a portion of the energy used to oscillate the motor and may release the stored energy at a fixed resonance of the spring. This may decrease a power output needed from the electromagnetic drive mechanism 200 to vibrate the conveyor trough.

The electromagnetic drive mechanism 200 may further include one or more drive weights. The drive weights may be used to cancel forces generated as a result of the electromagnetic drive mechanism and/or vibration of the conveyor trough. In this way, the drive weights may produce a linear reciprocating force directed along the longitudinal axis of the conveyor trough.

Each of the FIGS. 2-3 includes an axis system 290 comprising three axes, namely an x-axis parallel to a horizontal direction, a y-axis parallel to a vertical direction, and a z-axis perpendicular to both the x- and y-axes.

Specifically, the top plate may be in direct face-sharing contact with the upper bolt ring along a bottom planar face of the top plate and a top planar face of the bolt ring relative to a ground surface. Further, the bolt ring may be in direct face-sharing contact with the upper constant spring along a bottom planar face of the bolt ring and a top planar face of the upper constant spring relative to a ground surface. The upper constant spring, in at least one example, may further be in direct face-sharing contact with a center plate along a top planar surface of the center plate and a bottom planar surface of the upper constant spring relative to a ground surface. It will be appreciated that the above components, which may be configured to lie in direct face-sharing contact with one another, may be selectively or otherwise coupled to one another using bolts or other similar fastening mechanisms or methods such that they define a top half portion of the electromagnetic drive mechanism 200.

Similarly to the top half portion of the electromagnetic drive mechanism, the center plate may be in direct face-sharing contact with the lower constant spring along a bottom planar surface of the center plate and a top planar surface of the lower constant spring relative to a ground surface. The lower constant spring may further be in direct face-sharing contact with a lower bolt ring along a bottom planar surface of the lower constant spring and a top planar surface of the lower bolt ring relative to a ground surface. Further, the bottom plate may be configured such that it is in direct face-sharing contact with the lower bolt ring along a bottom planar surface of the lower bolt ring and a top planar surface of the bottom plate.

It will be appreciated that the top plate and bottom plate may be configured such that they may provide drive weight to the electromagnetic drive mechanism. Specifically, in at least one example, the top plate may comprise a top drive weight and a bottom plate may comprise a bottom drive weight.

The electromagnetic drive mechanism according to the first exemplary embodiment may comprise one or more auxiliary springs for transferring the electromagnetic forces supplied by the provided electromagnet into usable motion such as vibratory motion, for example.

Turning now to FIG. 2, the figure illustrates a first embodiment of an electromagnetic drive mechanism 200. In one example, the electromagnetic drive mechanism 200 may be used similarly to drive mechanism 20 of FIG. 1. In this figure, a self-contained drive unit is provided. The drive mechanism 200 may comprise a plurality of various interior components that may be substantially surrounded by one or more frames plates, and/or constant springs in at least one example. Further, the electromagnetic drive may comprise a power cable 202, which may extend from a bottom surface of the drive mechanism 200 relative to a ground surface and may be communicatively coupled to a power grid.

As shown in FIG. 3, the first exemplary embodiment of the electromagnetic drive mechanism 200 may comprise a center plate 204, an upper constant spring 206, an armature 208, one or more auxiliary springs 210, an inner drive weight 212, an electromagnet 214 (also referred to herein as an electromagnetic coil), and an upper bolt ring 216. In one example, the center plate 204 may be used similarly to center plate 24 of FIG. 1.

The center plate 204 of the electromagnetic drive mechanism 200 may be configured to provide a central planar surface of the drive mechanism 200 through which fasteners, such as screws, may pass, and may be configured as a mounting surface for mounting the drive mechanism 200 onto a conveyor or another similar vibratory motion device. The center plate 204 may divide a top portion of the electromagnetic drive mechanism 200 from a bottom portion of the mechanism 200. In some embodiments, each portion (i.e., a top portion and a bottom portion) may be virtually identical with the exception that a power cord, being the source of electrical energy (not shown), enters the electromagnetic drive mechanism 200 from a bottom surface of the unit to provide sufficient power so as to energize the electromagnet system. The electromagnetic drive mechanism 200 will be described in further detail below.

The upper bolt ring 216 may be configured to provide a rigid structure to the exterior of the drive mechanism 200 wherein one or more fastening devices, such as screws, may pass through the frame in order to secure the individual planar components and to house the components disposed within the interior of the drive mechanism 200.

An upper constant spring 206 may be provided in the drive mechanism 200 wherein the upper constant spring 206 may comprise an elastomeric spring and may additionally exhibit a substantially rectangular shape further comprising a substantially rectangular cross section, taken along an x-y plane, that may be bonded to a top surface of the center plate 204. Further, the upper constant spring 206 may surround and/or define an interior section of the electromagnetic drive mechanism 200. Additionally or alternatively, some embodiments may comprise an upper constant spring 206 having an elastomeric frame wherein the frame comprises one or more curvilinear transitional corners, which may connect the sides of the rectangular frame exhibited by the upper constant spring 206.

In some examples, the upper constant spring 206 may exhibit a wafer-type construction, wherein the upper constant spring comprises a single, continuous frame of material. However, it will be appreciated that other configurations of the upper constant spring 206 are contemplated herein. For example, in one embodiment, the upper constant spring 206 may comprise a discontinuous construction wherein the upper constant spring may comprise a shape other than that of a unitary rectangular ring.

An armature 208 may additionally be provided in the electromagnetic drive mechanism 200. The armature 208 may be fastened to the center plate 204. The armature 208 may extend from the center plate 204 toward the upper bolt ring 216. The electromagnet 214 and the inner drive weight 212 may be bolted between the top plate 402 and the bottom plate 406 (shown in FIG. 4) such that electromagnet 214 may move with the top and bottom plates but not with the center plate 204. When the electromagnet 214 becomes energized, the armature 208 may then be drawn toward the poles of the electromagnet 214. Further, the center plate 204 may be physically coupled to the upper constant spring 206 and the lower constant spring 408 such that the constant springs 206, 408 may provide a gap between upper and lower bolt rings 216, 404 and the center plate 204.

In at least one embodiment, each mass of the two-mass system may be relatively close in mass to one another. For example, the trough mass, wing plates, center plate, and the armature may be relatively close in mass to the top and bottom plates, auxiliary springs, the electromagnet, and to any ballast weights that may be desired to get the two-masses closer in mass to each other, for example within 5% in one example, or within 10% in another example.

The constant springs 206, 408, the upper and lower constant springs respectively, may be sized to exhibit a resonate frequency at the same resonant frequency of the feeder system. The set of auxiliary springs 210 may further be sized so as to provide resistance which may increase in virtual non-linear progression as the center plate 204 mounted armature 208 approaches the electromagnet 214.

Figure 8:
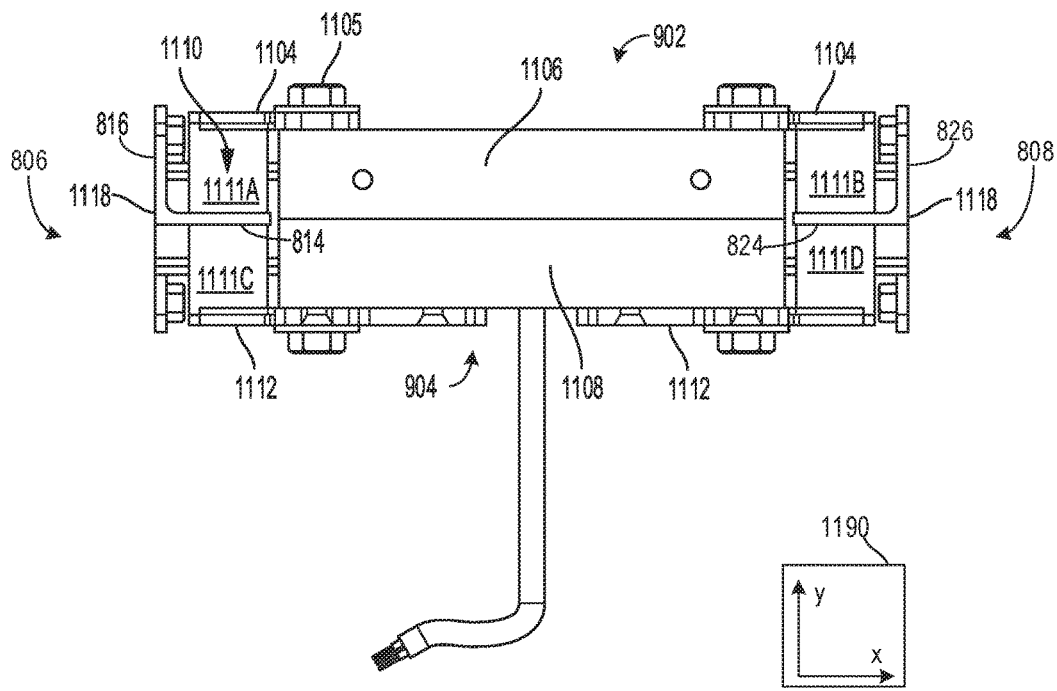
FIG. 8 is a front profile view of the second electromagnetic drive embodiment.
Figure 9:
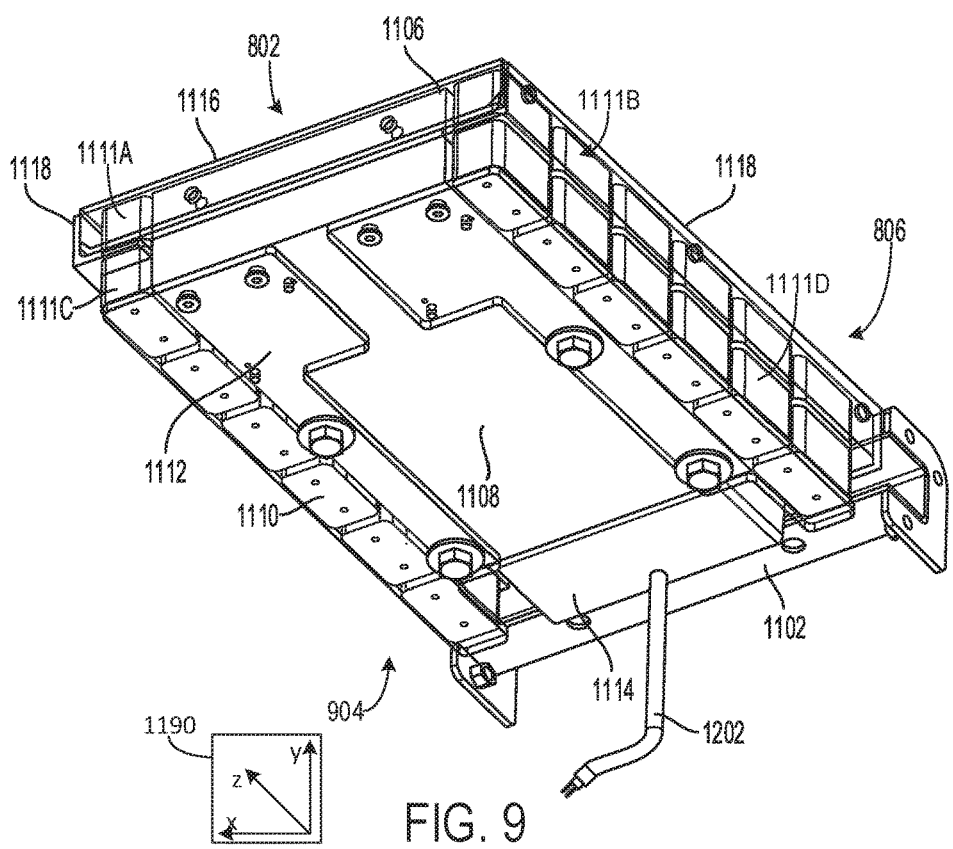
FIG. 9 shows an upward, right side isometric view of the second electromagnetic drive embodiment.

In one example, the increase in virtual non-linear progression may be carried out via the inclusion and use of several bumpers and auxiliary springs interfacing with each other in a sequential manner. For example, auxiliary springs such as illustrated in FIGS. 8-9 may be used.

It will be appreciated that the center plate 204 may comprise a substantially rectangular profile and may further comprise 4 curvilinear corners. Further, the center plate 204 may comprise one or more projections along its extreme ends perpendicular to its central axis 299, described further below as example tabs. The projection(s) may comprise a curvilinear bend that may be perpendicular to the plane of the center plate 204 at an angle of 90 degrees or less. In providing a curved or substantial bend projection along the lateral latitudinal faces of the electromagnetic drive mechanism, the ease of insertion and/or replacement of the drive mechanism within a conveyor system, for example, may be improved.

As shown in FIG. 3, an inner drive weight 212 may also be provided within an interior section of the drive mechanism 200. The inner drive weight 212 may be configured to provide weight or counterweight to the drive mechanism 200 to facilitate vibratory motion responsive to signals received from the electromagnet 214.

With respect to the provided electromagnet 214 of the first exemplary embodiment, the electromagnet 214 may be attached to a support structure such that the electromagnet 214 may move with the top and bottom plates but not with the center plate 204. When the electromagnet becomes energized, the armature 208 may then be drawn toward the poles of the electromagnet.

The upper bolt ring 216 may provide additional rigid support for the drive mechanism 200 such that the drive may maintain smooth and consistent operation when providing vibratory motion.

A lower constant spring 408 may also be provided. Similarly to the upper constant spring 206, the lower constant spring 408 may comprise an elastomeric spring element and may additionally exhibit a substantially rectangular shape further comprising a substantially rectangular cross section that may be bonded to a top surface of the center plate 204. Further, the lower constant spring 408 may surround and/or define an interior section of the electromagnetic drive at a position below the center plate 204. At least one example may comprise a lower constant spring 408 having an elastomeric frame, wherein the frame comprises one or more curvilinear transitional corners, which may connect the sides of the rectangular frame exhibited by the lower constant spring 408.

Repair of one or more of the components of the drive mechanism 200 may need the conveyor trough and/or conveyor pan to be lifted and decoupled from the drive mechanism 200. This may include a plurality of service people and/or a machine raising the conveyor trough and/or conveyor pan, which may weight hundreds of pounds, to access the drive mechanism 200. This may decrease efficiency and increase operating costs.

A second exemplary embodiment of the electromagnetic drive mechanism 1100 is provided in FIGS. 5-14. It will be appreciated that the second example embodiment may provide improved installation and removal characteristics when compared to the first embodiment provided with reference to FIGS. 2-3. Specifically, as one example, the second embodiment of an electromagnetic drive mechanism in accordance with the present disclosure may comprise components that may previously have been located on an interior of the drive that may be disposed along an exterior perimeter of the drive. Specifically, one or more auxiliary springs may be positioned along an exterior perimeter of the device such that the auxiliary spring(s) may be more easily removed and/or replaced. Additionally, a coil, a coil housing, and a coil housing mount are arranged on an exterior of the device. Lastly, the device is physically coupled to wing plates (e.g., wing plates 22 of FIG. 1) and not to the conveyor trough and/or conveyor pan. As such, the conveyor trough and/or conveyor pan do not need to be adjusted to access the electromagnetic drive mechanism 1100.

The FIGS. 4-13 may be described in relation to an axis system 1190 comprising three axes, namely an x-axis parallel to a horizontal direction, a y-axis parallel to a vertical direction, and a z-axis perpendicular to both the x- and y-axes. The axis system 1190 may be rotated to mimic a vantage point of the electromagnetic drive mechanism 1100 illustrated in different figures. Additionally, when applicable, the axis system 1190 may only include two of the three axes when the electromagnetic drive mechanism 1100 is illustrated in a two-dimensional view. As such, only the two relevant axes (e.g., the axes corresponding to the plane in which the electromagnetic drive mechanism 1100 is being illustrated) are included.

Operating the electromagnetic drive mechanism 1100 or other electromagnetic drive mechanisms may produce heat as a byproduct. As temperatures of components in or around the electromagnetic drive mechanism increase, then a fidelity of such components may decrease, which may lead to degradation. Degradation may include one or more of cracks, leaks, holes, loss of rigidity, loss or flexibility, or the like. Additionally or alternatively, components may become misshapen due to the increased temperatures. As such, the electromagnetic drive mechanism 1100 described herein with respect to FIGS. 10 to 20 describes an easily accessible electromagnetic drive mechanism with reduced repair times relative to other electromagnetic drive mechanisms (e.g., drive mechanism 200 of FIG. 2). The reduction in repair times may be owed to the mounting of the various components of the electromagnetic drive mechanism 1100 independently of one another and a conveyor pan (e.g., conveyor trough 14 of FIG. 1).

The description will now turn to the second embodiment of an electromagnetic drive mechanism configured to drive a vibratory conveyor or the like. The second embodiment of the electromagnetic drive mechanism provides a solution to the cumbersome method of removing a conveyor trough and/or conveyor pan and dismantling portions of a drive mechanism to access its various parts. As such, differences between the first embodiment described above and the second embodiment described below will become more apparent. Outside of the mounting of various components in the first and second embodiments, the second embodiment of the electromagnetic drive mechanism may differ from the first embodiment of the electromagnetic drive mechanism in that it does not comprise an armature.

Figure 4:
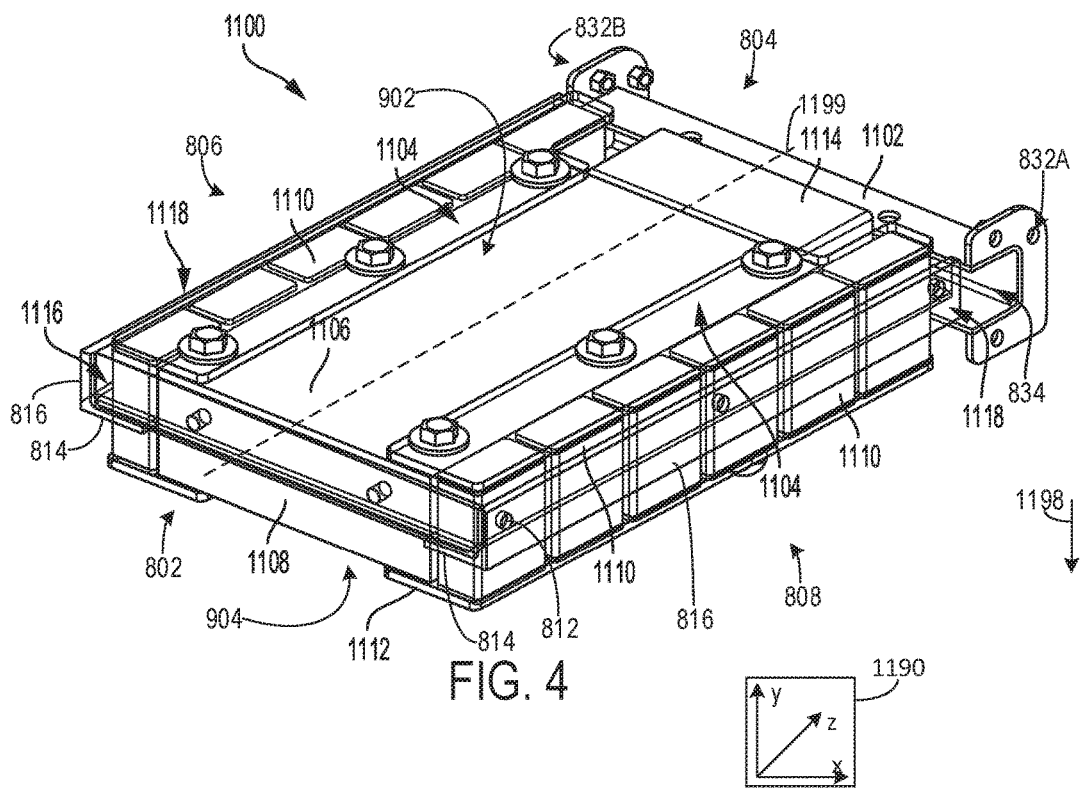
FIG. 4 is a top, right side isometric view of the second electromagnetic drive embodiment.

Turning now to FIG. 4, the second exemplary electromagnetic drive mechanism 1100 is provided. The electromagnetic drive mechanism 1100 may be used similarly to drive mechanism 20 of FIG. 1. It will be appreciated that the electromagnetic drive mechanism 1100 may also be used with other types of the conveyance systems other than the conveyor system 10 of FIG. 1. The electromagnetic drive mechanism 1100 may comprise a mounting bracket 1102, one or more upper clamp plates 1104, an upper drive weight 1106, a lower drive weight 1108, one or more auxiliary springs 1110, one or more lower clamp plates 1112, an electromagnet 1114, a mount angle tie bar 1116, and one or more mount angles 1118. In some examples, the upper clamp plates 1104 may be referred to as top clamp plates 1104, the lower clap plates 1112 may be referred to as bottom clamp plates 1112, the electromagnet 1114 may be referred to as coil 1114, and the mount angle tie bar 1116 may be referred to as tie plate 1116. In this second exemplary embodiment, some components of the drive mechanism such as the electromagnet and/or the auxiliary springs may be positioned in such a manner so as to allow for ease of replacement and/or repair. In this way, a single, unitary electromagnetic drive mechanism may be provided wherein routine maintenance and/or repairs may not need complete removal of the drive mechanism. Rather, the components that typically wear the fastest, such as the electromagnet or the auxiliary spring(s), may be removed individually while the drive mechanism may remain in position on a conveyor or other such vibratory motion utilizing device.

Said another way, the mounting and physical couplings of the various components described above provide a user quick and easy access to one or more of the springs 1110 and the upper 1106 and lower 1108 drive weights relative to the drive mechanism 200 described above. As will be described below, the upper 1106 and lower 1108 drive weights and the springs 1110 are mounted independently of a conveyor trough (e.g., conveyor trough 14 of FIG. 1).

It will appreciated that additional embodiments are also contemplated herein. For example, in at least one embodiment, the electromagnetic drive mechanism 1100 may comprise a singular, unitary drive weight. As such, the singular drive weight may comprise the combined dimensions of an upper drive weight 1106 and a lower drive weight 1108. With a singular drive weight, the vibrational motion may be consistently applied without interference due to potential misalignment.

As another example, an upper drive weight 1106 and a lower drive weight 1108 may be provided wherein the upper and lower drive weights are placed in direct face-sharing contact with one another. Once the two drive weights are placed in contact, they may then be coupled together via a coupling mechanism. A coupling mechanism may include one or more of a tie, a retention band, a weld junction, or any other suitable method of joining the upper and lower drive weights. It will further be appreciated that the number of drive weights may be adjusted to accommodate different feeder configurations. Thus, although described with one or two weights, three, four, or more weights may be used.

In the view of FIG. 4, the electromagnetic drive mechanism 1100 is a rectangular prism, in one example, having a rectangular cross-section along an x-z plane and a y-z plane. The electromagnetic drive mechanism 1100 comprises a first lateral side 802 perpendicular to a central axis 1199, which is parallel to a longitudinal axis of the electromagnetic drive mechanism 1100. Opposite the first lateral side 802, there is a second lateral side 804 spaced away from the first lateral side 802 by a length of the electromagnetic drive mechanism 1100 measured along the z-axis. The first lateral side 802 and the second lateral side 804 may define a width of the electromagnetic drive mechanism 1100 measured along the x-axis. Furthermore, there is a first longitudinal side 806 and a second longitudinal side 808 arranged oppositely one another about the central axis 1199. The first longitudinal side 806 and the second longitudinal side 808 are separated from one another by a width of the electromagnetic drive mechanism 1100.

The first longitudinal side 806 and the second longitudinal side 808 are substantially similar. Both comprise at least one of the mount angles 1118. In one example, the mount angles 1118 are configured to physically couple to one or more conveyor wing plates (e.g., wing plates 22 of FIG. 1) via one or more of bolts, screws, or the like. Specifically, the mount angles 1118 comprise a plurality of openings 812, where each opening of the openings 812 is configured to receive a fastener in a direction perpendicular to the central axis 1199. One of the mount angles 1118 may physically couple to a wing plate nearest the first longitudinal side 806 and the other of the mount angles may physically couple to a wing plate nearest the second longitudinal side 808. In one example, there are exactly two mount angles 1118, each mount angle of the mount angles comprising three of the openings 812. The openings 812 may be arranged equidistantly and symmetrically to one another.

The mount angles 1118 comprise a substantially L-shaped cross-section along the y-z plane. Thus, the mount angles 1118 comprise an inner portion 814 and an outer portion 816, where the inner portion 814 may extend from the outer portion 816 toward the central axis 1199. In one example, auxiliary springs 1110 may be arranged on opposite sides of the inner portion 814. The openings 812 are arranged on the outer portion 814, which extends upward in a direction away from a floor upon which a conveyor system (e.g., conveyor system 10 of FIG. 1) may rest. It will be appreciated that the outer portion 814 may extend downward toward the floor without departing from the scope of the present disclosure. Additionally or alternatively, in some embodiments, the mount angles 1118 may comprise a substantially T-shaped cross-section along the y-z plane where the outer portion 814 extends in both the upward and downward directions.

The first lateral side 802 may comprise a tie plate 1116 having an L-shaped cross-section along the y-z plane. The tie plate 1116 may comprise a first surface 822 and a second surface 824, where the first surface 822 extends in an upward direction, similar to the outer portion 816 of the mount angles 1118. The second surface 824 extends from an edge of the first surface 822 in a direction away from the second lateral side 804. The second surface 824 may be parallel to and in face-sharing contact with the inner portion 814 of each of the mount angles 1116.

The tie plate 1116 may be arranged between the inner 814 and outer 816 portions of the mount angles 1116. In one example, the tie plate 1116 is welded, fused, bolted, or otherwise coupled to each mount angle of the mount angles 1118. The first surface 822 may be welded to the outer portion 816 at edges of the first surface 822 adjacent to the first longitudinal side 806 and the second longitudinal side 808. Additionally, the second surface 824 may be welded to the inner portion 814.

Furthermore, the first surface 822 may comprise one or more openings 826, each configured to receive a fastener therethrough. In one example, there are exactly two openings 826, however, there may be other numbers of openings 826 without departing from the scope of the present disclosure. The openings 826 may allow a fastener (e.g., bolt, screw, or the like) to physically couple the tie plate 1116 to a drive weight. In one example, the first surface 822 physically couples to the upper drive weight 1106.

The tie plate 1116 may maintain a distance between the mount angles 1118. The tie plate 1116 may also fixedly hold the upper drive weight 1106 in place while one or more of the springs 1110 are being replaced from the electromagnetic drive mechanism 1100. By doing this, the springs 1110 may be accessible to a user without removing a conveyor trough and/or the drive weights of the electromagnetic drive mechanism 1100.

The second lateral side 804 comprises a mounting bracket 1102 comprising a C-shaped and/or U-shaped cross-section for a cross-section taken along a y-z plane. The mounting bracket 1102 may be physically coupled to one or more wing plates (e.g., wing plates 22 of FIG. 1). Specifically, the mounting bracket 1102 comprises a plurality of side openings 832A and 832B, where each opening of the openings 832A and 832B is configured to receive a fastener or other coupling device to physically couple to wing plates. In one example, the openings 832A may correspond to a wing plate adjacent to the second longitudinal side 808 and the openings 832B may correspond to a wing plate adjacent to the first longitudinal side 806.

The mounting bracket 1102 further comprises a gap 834 configured to receive the coil 1114. Specifically, gap 834 is shaped similarly to the coil 1114 such that it may receive the coil 1114 and/or a coil housing coupled to the coil 1114. The mounting bracket 1102 further comprises openings 836 adjacent the gap 834, where the openings 836 are configured to allow fasteners to pass through a portion of the mounting bracket corresponding to the gap 834 and a housing of the coil 1114. The coil housing is shown in greater detail with respect to FIG. 13.

In one example, the coil 1114 is slidably coupled to the coil housing, while the coil housing is physically coupled to the mounting bracket 1102. There may be a finite space and/or gap located between the coil 1114 and the upper drive weight 1106 and the lower drive weight 1108. When the coil 1114 is energized, it may be attracted to the upper 1106 and lower 1108 drive weights, thereby moving the coil 1114 toward the drive weights and away from the coil housing. When the coil 1114 is de-energized (e.g., not energized), the coil 1114 may move away from the upper 1106 and lower 1108 drive weights and toward the coil housing. This oscillating motion may translate into motion of a conveyor (e.g., conveyor trough 14 of FIG. 1). This action will be described in greater detail below with respect to FIG. 13.

In this way, the tie plate 1116, the mounting bracket 1102, and the mount angles 1118 define the most exterior portions of the electromagnetic drive mechanism 1100 along its first lateral side 802, its second lateral side 804, and its first 806 and second 808 longitudinal sides, respectively. The electromagnetic drive mechanism 1100 further comprises a top surface 902 and a bottom surface 904 relative to a direction of gravity 1198. In the view of FIG. 4, the top surface 902 is exposed and the bottom surface 904 is occluded. Top clamp plates 1104 may be arranged on the top surface 902. In one example, there are exactly two top clamp plates 1104, where a first top clamp plate is biased toward the first longitudinal side 806 and where a second top clamp plate is biased toward the second longitudinal side 808. The first and second top clamp plates may be evenly spaced from one another about the central axis 1199. Bottom clamp plates 1112 may be arranged on the bottom surface 904 in a manner similar to the top clamp plates 1104. In one example, first and second bottom clamp plates are arranged directly below first and second top clamp plates, respectively. The first top clamp plate is shown in greater detail in FIG. 13. It will be appreciated that each clamp plate of the top 1104 and bottom 1112 clamp plates is substantially similar and only the orientation or vertical positioning of each of the clamp plates may be different.

The top clamp plates 1104 are physically coupled to the upper drive weight 1106 via fasteners 1105. The bottom clamp plates 1112 are physically coupled to the lower drive weight 1108 via fasteners different than the fasteners 1105 shown. In one example, the fasteners 1105 only couple the upper drive weight 1106 to the top clamp plates 1104. As such, the fasteners 1105 do not extend into the lower drive weight 1108. The fasteners coupling the lower drive weight 1108 to the bottom clamp plates 1112 may be substantially similar to the fasteners 1105. As such, the fasteners coupling the lower drive weight 1108 to the bottom clamp plates 1112 may not extend into the upper drive weight 1106.

In some examples, additionally or alternatively, the fasteners 1105 extend entirely through the upper 1106 and lower 1108 drive weights and physically couple to a nut arranged outside of the bottom clamp plates 1112. Thus, each fastener of the fasteners 1105 may extend through an entire height of the electromagnetic drive mechanism 1100 from the top clamp plates 1104 to the bottom clamp plates 1112. As such, the upper 1106 and lower 1108 drive weights are fixedly coupled and do not move during an actuation of the conveyor.

For example, the top clamp plate 1104 and the bottom clamp plate 1112 may additionally function as exterior drive weights for the drive mechanism 200. In another exemplary embodiment, additional plates or masses may be added to the top clamp plate 1104 and bottom clamp plate 1112 to provide supplementary mass to account for heavier pans or troughs. The exterior drive weights may further function to counterbalance the weight provided by the upper 1106 and lower 1108 drive weights such that a smooth operation of the drive providing vibratory motion is made possible.

Thus, the top clamp plates 1104, the bottom clamp plates 1112, the mount angles 1118, the tie plate 1116, and the coil mount bracket 1102 are the exterior most components of the electromagnetic drive mechanism 1100 and they may define a boundary about which the coil 1114, spring 1110, and upper 1106 and lower 1108 drive weights are arranged.

The upper drive weight 1106 and the lower drive weight 1108 may be substantially similar in shape and size. In one example, both the upper 1106 and the lower 1108 drive weights are rectangular, similar to the electromagnetic drive mechanism 1100. Thus, the central axis 1199 may also function as a central axis for the upper 1106 and lower 1108 drive weights.

The springs 1110 may be arranged adjacent to the longitudinal sides of the upper 1106 and lower 1108 drive weights. Specifically, there may be four groups of the springs 1110 including a first group 1111A, a second group 1111B, a third group 1111C, and a fourth group 1111D. The first group 1111A is arranged between the first longitudinal side 806 and the upper drive weight 1106. The second group 1111B is arranged between the second longitudinal side 808 and the upper drive weight 1106. The third group 1111C is arranged between the first longitudinal side 806 and the lower drive weight 1108. The fourth group 1111D is arranged between the second longitudinal side 808 and the lower drive weight 1108. In this way, the first group 1111A may be arranged directly above the third group 1111C and the second group 1111B may be arranged directly above the fourth group 1111D. Each of the groups may comprise a similar number of springs 1110. In one example, each of the first 1111A, second 1111B, third 1111C, and fourth 1111D comprises exactly five springs. Additionally, each spring of the springs 1110 may be substantially identical and springs included in each of the groups are substantially identical. For example, the springs in the first group 1111A are substantially identical to springs in the second groups 1111B.

As shown, each spring of the springs 1110 is segmented. For example, if the first group 1111A comprises five springs, then it comprises a first spring segment, a second spring segment, a third spring segment, a fourth spring segment, and a fifth spring segment. The spring segments are arranged such that their longitudinal sides (e.g., long sides) is parallel to the central axis 1199 of the electromagnetic drive mechanism 1100. Thus, lateral sides (e.g., short sides) of the spring segments are perpendicular to the central axis 1199. By including a plurality of segmented individual springs adjacent to one another along a common axis parallel to the central axis 1199, a greater control over an operating frequency may be realized compared to the drive mechanism 200 of FIG. 2. More or fewer springs may be included in the electromagnetic drive mechanism to adjust a frequency of the electromagnetic drive mechanism 1100. Additionally or alternatively, by segmenting the springs 1110, individual springs may be replaced when desired, thereby reducing cost and waste.

Said another way, each spring of the springs 1110 may exhibit a wafer type construction, wherein the lower constant spring comprises a single, continuous frame of material. However, it will be appreciated that other configurations of the springs are contemplated herein. For example, in one embodiment, each spring of the springs 1110 may comprise a discontinuous construction wherein the lower constant spring may comprise a shape other than that of a unitary rectangular ring.

The coil 1114 may be arranged between the coil mount bracket 1102, the upper 1106 and lower 1108 drive weights, and one or more springs 1110. Specifically, the coil 1114 is arranged between only the springs of the springs 1110 closest to the second lateral side 804. The coil 1114 may comprise a rectangular prism shape with a rectangular cross-section along the x-z plane. However, a longitudinal axis of the coil 1114 is arranged perpendicularly to the central axis 1199. Said another way, longitudinal sides (e.g., long sides) of the coil 114 are arranged perpendicularly to the central axis 1199.

As described above, the coil 1114 may be energized or not energized. When energized, the coil 1114 may be attracted to the upper 1106 and lower 1108 drive weights such that it moves toward the drive weights. Thus, when the coil 1114 is not energized, the coil 1114 is not attracted to (e.g., is repulsed by) the upper 1106 and lower 1108 and moves away from the drive weights. This energization and de-energization may result in the oscillating motion described above.

By arranging an electromagnetic drive mechanism 1100 as described above, a user may more easily access one or more of the springs 1110, upper drive weight 1106, lower drive weight 1108, and coil 1114. As an example, if a spring of the first spring group 1111A was determined to be degraded, then a user may simply remove the upper clamp plate of the upper clamp plates 1104 and the mount angle of the mount angles 1118 nearest the first longitudinal side 806. As such, the coil 1114, the upper drive weight 1106, and the lower drive weight 1108 may remain mounted in position. As another example, if a user desired to access the coil 1114, then the user may simply decouple the coil housing from the coil mounting bracket 1102. This may allow the user to slide the coil 1114 and its housing along the gap 834 of the coil mounting bracket 1102. As another example, if a user desired to access the upper drive weight 1106, then the user may decouple the upper drive weight 1106 from each of the top clamp plates 1104 and the tie plate 1116. This may allow the user to remove the upper drive weight 1106 while the first group 1111A, second group 1111B, third group 1111C, fourth group 1111D, lower drive weight 11108, and coil 1114 remain mounted. Independent mounting of each of the above described components allows a user quick access with minimal assistance. As such, a trough and/or pan of a conveyor is not moved or adjusted in any way. As a counter example, access to components of the electromagnetic drive mechanism 200 described above may need two or more people to lift a trough and/or pan (which may weigh over 300 pounds) to access the drive mechanism.

Figure 5:
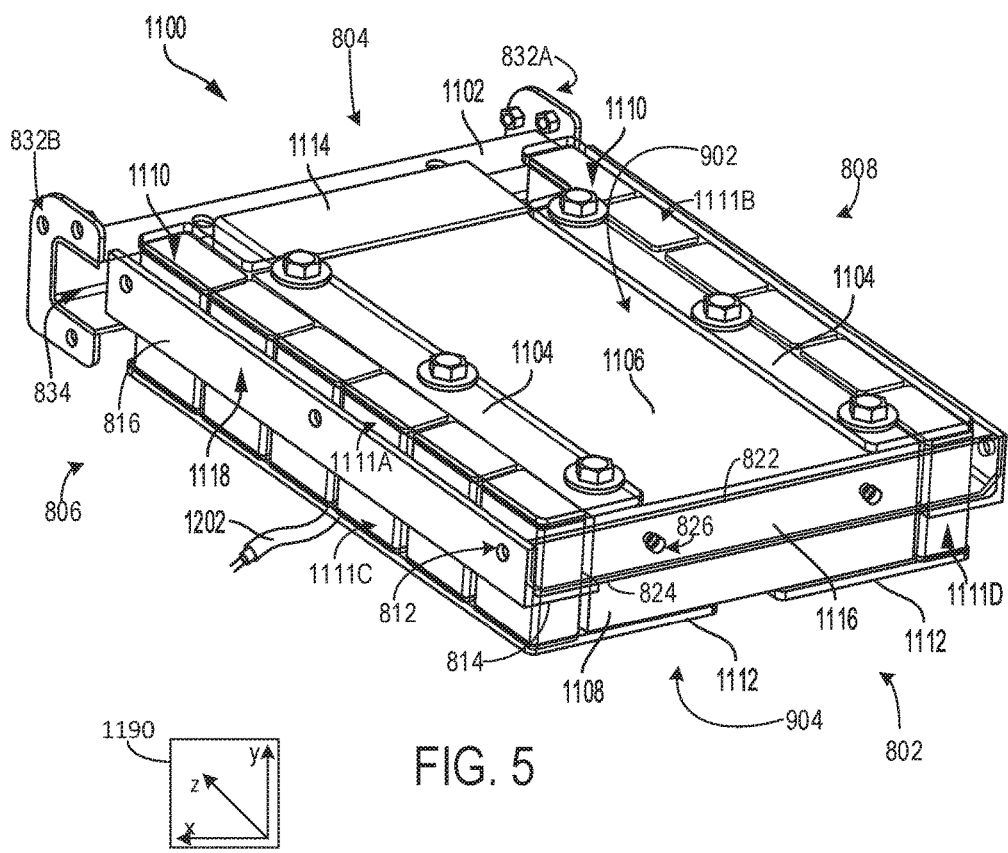
FIG. 5 is a top, left side isometric view of the second electromagnetic drive embodiment.

Another isometric view of the electromagnetic drive mechanism 1100 is provided in FIG. 5. As such, components previously presented may be similarly numbered in subsequent figures and may not be reintroduced for reasons of brevity. Here, additional features and components such as a power supply cord 1202 may be visible. In this view, the one or more mount angles 1118 are shown securing the one or more auxiliary springs 1110 to the body of the drive mechanism 1100. The mount angle may further be secured to the drive mechanism via the inclusion of a mount angle tie bar 1116. The mount angle tie bar 1116 may be secured to an upper drive weight 1106 via the use of fastening elements such as screws or other suitable fastening mechanisms or methods.

Additionally, upper clamp plates 1104 and lower clamp plates 1112 may be provided. The upper and lower clamp plates may be configured to retain the one or more auxiliary springs 1110 between each other. For example, the upper clamp plate(s) 1104 may be in direct face-sharing contact with the one or more auxiliary springs 1110 on respective top or upper surfaces relative to the positioning of the drive mechanism, and the lower clamp plate(s) may be in direct face-sharing contact with the one or more auxiliary springs on a respective bottom or lower surface relative to the positioning of the drive mechanism. In this way, it may be possible to remove and/or replace the auxiliary springs more easily; i.e., without having to remove the entire drive mechanism from a conveyor or other such vibratory motion utilizing device. For example, if one or more auxiliary springs 1110 on the respective top or upper surfaces is degraded (e.g., cracked or the like), then only the upper clamp plate(s) 1104 may be removed to access the one or more auxiliary springs 1110 on the top or upper surface.

The upper drive weight 1106 may be in direct face-sharing contact with at least a portion of the one or more upper clamp plates 1104 along a top medial face relative to the positioning of the drive mechanism. The lower drive weight 1108 may be in direct face-sharing contact with the one or more lower clamp plates 1112 along a bottom medial face relative to the positioning of the drive mechanism. It will be appreciated that in at least one embodiment, the upper and lower drive weights 1106, 1108 do not contact the auxiliary springs directly. The clamp plates 1104, 1112 may provide an interface between the auxiliary springs 1110 and the drive weights 1106, 1108.

Figure 6:
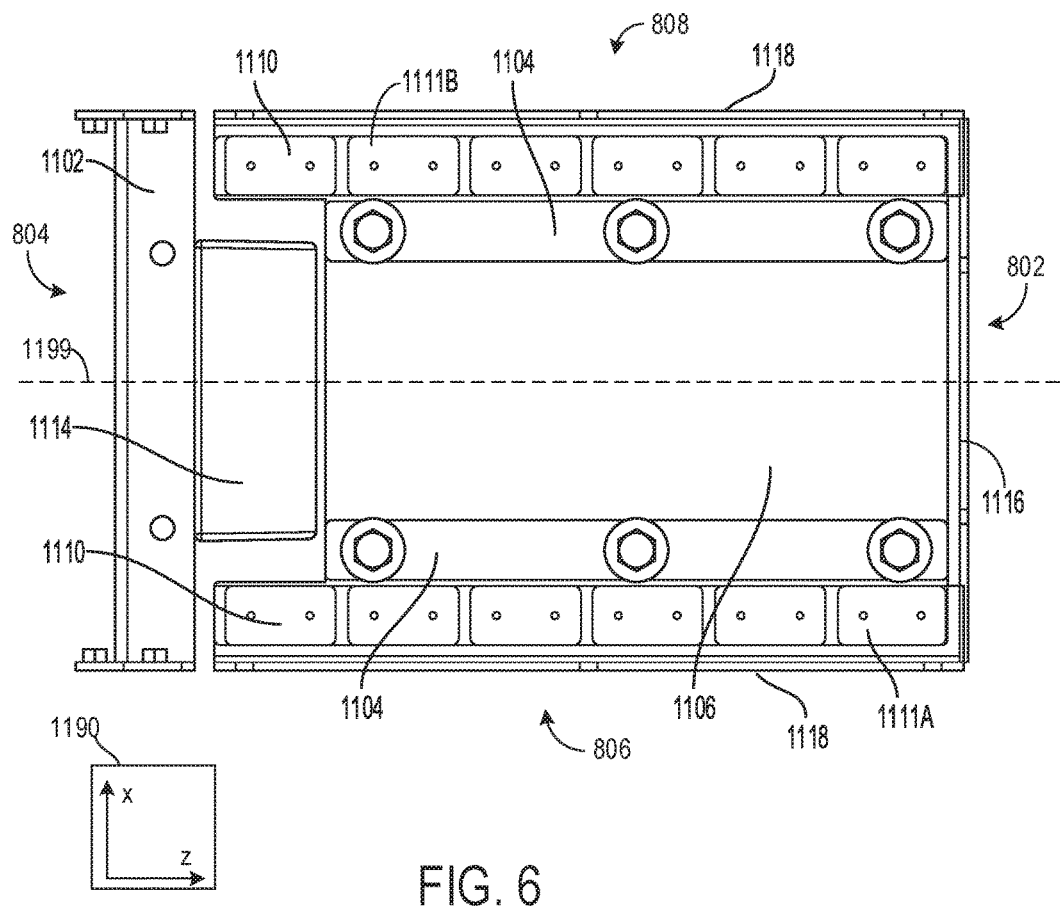
FIG. 6 shows a plan view of the second electromagnetic drive embodiment.

Turning now to FIG. 6, a top-down plan view of the electromagnetic drive mechanism 1100 is illustrated. The electromagnetic drive may comprise the mounting bracket 1102 which may be configured to couple the drive 1100 to a conveyor or other similar vibratory motion utilizing device. The mounting bracket 1102 may releasably retain the electromagnet 1114 via the use of fastening elements, such as screws, that fully traverse a top plane of the bracket 1102 and a rear section of the electromagnet 1114. The electromagnet in such an embodiment may comprise a substantially rectangular shape wherein a secondary structure may be affixed to a rear, lateral surface of one of the two most longitudinal edges. In some examples, such a secondary structure affixed to the rear of the electromagnet may comprise one or more hollow tubular components retained by a pair of horizontal planar protrusions connected to the electromagnet housing. In this way, a screw or other similar fastener may be inserted through a top planar surface of the mounting bracket 1102 and through the secondary structure(s) of the electromagnet such that the electromagnet may be selectively retained by the bracket.

Figure 7:
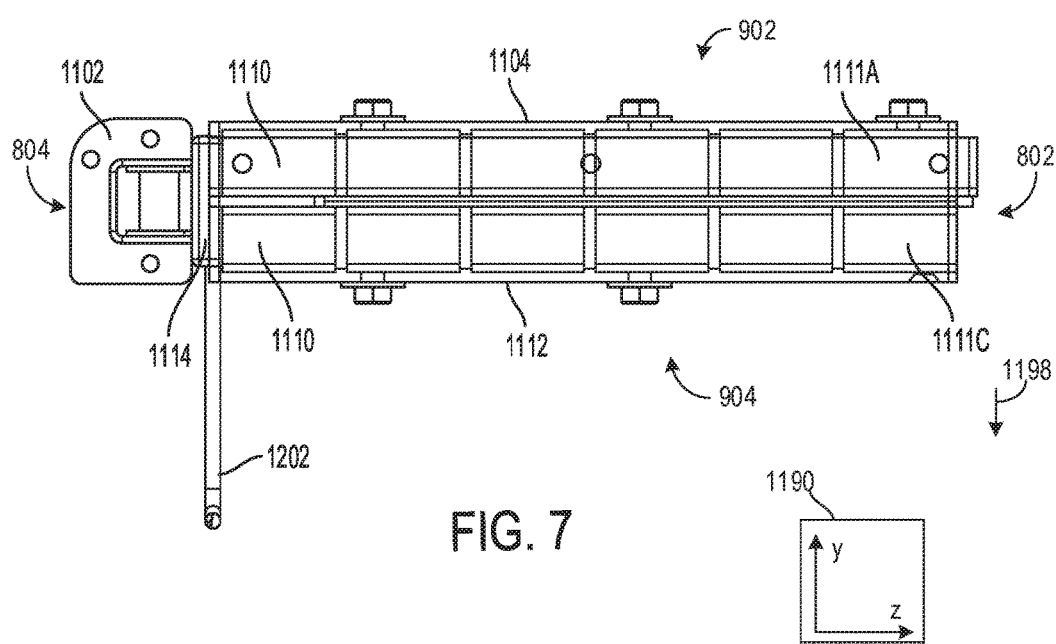
FIG. 7 is a side profile view of the second electromagnetic drive embodiment.

As illustrated in FIG. 7, the mounting bracket 1102 may comprise a shape similar to that of the letter C when viewed from a side profile. When viewed from above or below, the bracket 1102 may comprise a shape substantially similar to the letter U. In this way, the mounting bracket may retain components such as the electromagnet 1114 via vertical fastening methods, and thus, the electromagnet 1114 may additionally be mounted to a vibratory motion utilizing device such as a conveyor via horizontal positioning of one or more fastening mechanisms. It will be appreciated that in at least one example, the mounting bracket, while coupled to the electromagnet as described above, may be mounted directly to a conveyor, for example, and the auxiliary springs retained by the one or more mount angles may be mounted directly to a pan or trough of a conveyor, for example. In this way, it may be possible to remove only the electromagnet without removing the trough/pan of a conveyor and without removing the drive mechanism itself. The drive mechanism therefore, may comprise one or more subassemblies that may be selectively coupled to one another.

In FIG. 8, a front profile view of the second exemplary electromagnetic drive embodiment is shown. In this view, it may be more apparent that the mount angle(s) 1118 may comprise a 90 degree profile, wherein the mount angle(s) have a horizontal planar surface and a vertical planar surface that are perpendicular to the horizontal planar surface. In one example, the mount angle(s) 1118 are L-shaped. Further, the mount angle(s) may be positioned along one or more of the two most longitudinal lateral faces such that a plurality of auxiliary springs 1110 may be selectively retained therein.

For example, one or more auxiliary springs 110 may be positioned above and/or below the horizontal planar surface of the mount angle 1118.

As one example, the mount angle 1118 may selectively retain one or more auxiliary springs 1110 via horizontal disposal of one or more fastening devices, such as screws, that may fully traverse one or more auxiliary springs 1110 and at least partially traverse a lateral edge of the upper drive weight 1106. In a similar manner, the mount angle 1118 may selectively retain one or more auxiliary springs 1110 via horizontal disposal of one or more fastening devices, such as screws, that may fully traverse one or more auxiliary springs and at least partially traverse a lateral edge of the lower drive weight 1108.

Specifically, the embodiment shown in FIG. 8 illustrates a view the first lateral side 802, where the tie plate 1116 is omitted. As such, internal components and their relation to one another is better shown. For example, the inner portion 814 of the mount angle of the mount angles 1118 nearest the first longitudinal side 806 is shown extending between the first 1111A and third 1111C groups of springs 1110. Similarly, the inner portions 814 of the mount angle of the mount angle 1118 nearest the second longitudinal side 806 is shown extending between the second 1111B and fourth 1111D groups of springs 1110. As shown, the inner portions 814 do not contact the upper 1106 and/or lower 1108 drive weights.

The upper 1106 and lower 1108 drive weights are in face-sharing contact along shared longitudinal surfaces. The upper drive weight 1106 is physically coupled to the top clamps 1104 as described above. As shown, the fasteners 1105 only couple the top clamps 1104 to the upper drive weight 1106. Similarly, the fasteners 1505 only couple the bottom clamps 1112 to the lower drive weight 1108.

In some embodiments, additionally or alternatively, the fasteners 1505 are nuts 1505, the nuts being configured to receive ends of the fasteners 1105. As such, the fasteners 1105 may extend through an entire height of the upper 1106 and lower 1108 drive weights. In one example, the fasteners 1105 are bolts, where a head of the bolts is flush with the top clamp 1104 and where an extreme end of the bolts is locked with a nut of the nuts 1505 at the lower clamp 1108. This coupling may prevent movement of the upper 1106 and lower 1108 drive weights.

In FIG. 9, an upward isometric view of a second exemplary embodiment is provided. In this figure, retention members such as the lower clamp plates 1112 are visible. In some examples, the lower clamp plates may selectively retain the one or more auxiliary springs 1110 at a position between a top surface of the lower clamp plate and a bottom surface of the upper clamp plate. In this configuration, a single, unitary electromagnetic drive may be provided wherein the internal components may be removed more easily. The improved ease of removal of components within the electromagnetic drive may provide advantages such as reduced cost resultant from machine downtime, for example.

In at least one example, the upper drive weight 1106 and the lower drive weight 1108 may comprise a substantially similar construction. As one example, the drive weights may be constructed from a steel plate, may be cut to a desired length, and may further be drilled and/or milled to include a plurality of holes through which fastening devices may traverse. As a particular example, the drive weights 1106 and 1108 may comprise a 2 inch by 12 inch profile constructed from flat mild steel. It will be appreciated that the materials of construction for the drive weights may be any suitable material such that continuous vibratory motion may not result in undue wear and tear of the drive weights. Additionally, the upper drive weight 1106 and the lower drive weight 1108 may be constructed from different materials so long as the material of construction may withstand the forces supplied by the electromagnetic drive.

As one example embodiment, the upper and lower drive weights 1106, 1108, may comprise substantially similar sizes, shapes, and masses and may be constructed from magnetically active materials. It will be appreciated that in electromagnetic drive embodiments that do not comprise an armature 208, the drive weights may comprise magnetically active materials such that the electromagnet may attract and/or repel the weights providing a vibratory motion. In another example embodiment, the upper drive weight 1106 and the lower drive weight 1108 may comprise different shapes relative to one another, but may comprise substantially similar masses and may be spaced an equal distance from an optional center plate. Additionally, in one embodiment, an electromagnetic drive may not comprise upper and lower clamp plates 1104, 1112. Rather, in this exemplary embodiment, the upper and lower drive weights 1106, 1108 may be machined to include a partially elevated ledge or protrusion along an exterior, latitudinal, lateral edge such that the partially elevated ledge or protrusion may extend over a top and/or bottom surface of a plurality of auxiliary springs 1110.

The upper and lower clamp plates may, in some examples, be constructed from the same or similar materials. As one example, the clamp plates, both lower and upper may be constructed from steel or another suitable material such that the continuous vibratory motion supplied by the electromagnetic drive may not cause undue stress or wear and tear to the plates. In some examples, the clamp plates may bolt directly to the provided drive weights in order to secure the one or more auxiliary springs 1110 of the drive between the lateral edges of the drive weights and the vertical faces of the mount angles.

With respect to the auxiliary springs 1110, in at least one example, the auxiliary springs may be mounted in a position between the clamp plate(s) and the mount angle(s). Further, the auxiliary springs 1110 may be disposed along the perimeter of the lateral edges of the drive weights so as to allow the auxiliary springs to be removable when the clamp plates are removed. It will be appreciated that the total number of auxiliary springs and the durometer value of such auxiliary springs may be variable and may be altered based on desired performance of the electromagnetic drive. Specifically, the number and durometer value of the provided auxiliary springs may be changed in order to affect the operating frequency of the conveyor or other vibratory motion utilizing device.

Figure 10:
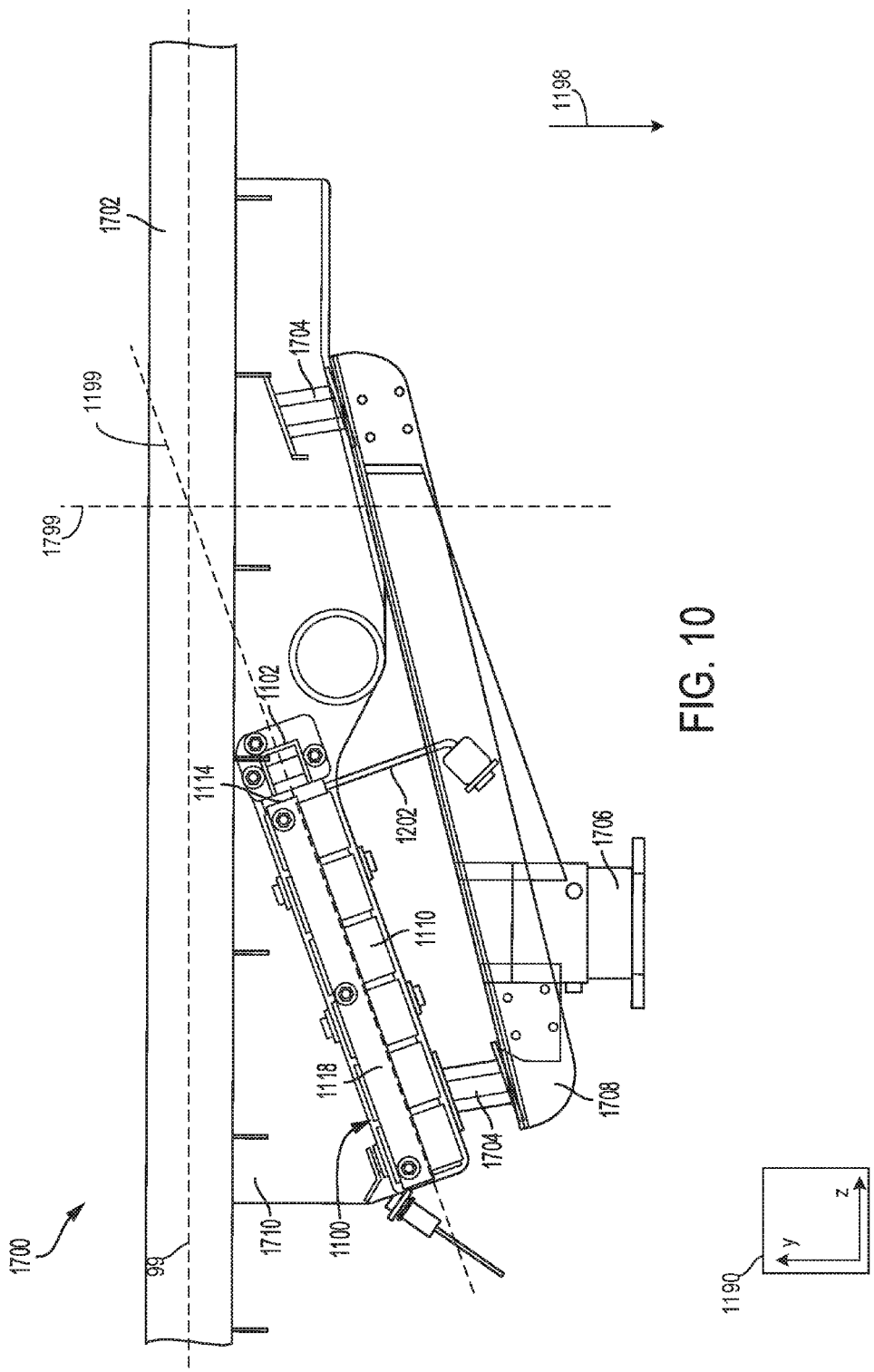
FIG. 10 illustrates the second electromagnetic drive embodiment coupled to a conveyor.

As shown in FIG. 10, the mount angle as provided in the second exemplary embodiment may be configured to bolt directly to a conveyor or other vibratory motion utilizing device at one or more wing plates 1710 (e.g., wing plates 22 of FIG. 1). The mount angle therefore selectively couples the drive weight(s) and the auxiliary spring(s) to the conveyor, for example. The mount angles may further be located so that the center of mass of the conveyor and the drive mechanism may be aligned through the force vector of the drive.

Specifically, the electromagnetic drive mechanism 1100 is shown mounted at an angle α formed between the central axis 1199 and the longitudinal axis 99. By mounting the electromagnetic drive mechanism 1100 at the angle α, the central axis 1199 of the electromagnetic drive mechanism

1100 may point directly to a center of gravity (axis 1799) of the conveyor system 10. This may reduce unwanted motion, pitching, and the like.

For example, a mounting bracket 1102 may be configured to bolt directly to wing plates of a conveyor such that the electromagnet may be positioned with a predetermined distance and position relative to the drive weights. The bracket may further allow for improved ease of removal of the electromagnet from a conveyor, for example, without demanding the removal of the pan or trough of a conveyor and without removing the drive mechanism from the conveyor.

The electromagnet may be mounted into the mounting bracket, which may further be attached to a conveyor, for example, and may create and impart a magnetic force onto the one or more drive weights. The oscillating motion of the coil 1114 with respect to the upper 1106 and lower 1108 drive weights when the coil 1114 is energized and deenergized may translated into linear motion of the conveyor, similar to the linear motion described above with respect to FIG. 1.

A mount angle tie bar 1116 may be coupled via welding, for example, to the one or more mount angles 1118 in order to establish and maintain a distance between said mount angles. The tie bar 1116 may be configured to rigidly connect the drive weights to a conveyor pan or another similar structure while components of the drive are replaced or during routine maintenance.

An example configuration incorporating the second exemplary electromagnetic drive embodiment is illustrated in FIG. 10. In this figure, the electromagnetic drive may be coupled to a vibratory article delivery apparatus, also referred to herein as a vibratory motion utilizing device, such as a conveyor system, for example. As one example, a conveyor system may comprise one or more wing plates 1710 and a trough or pan 1702. The electromagnetic drive mechanism 1100, according to a second embodiment of the present disclosure, may then be selectively coupled to the example conveyor system previously described via one or more mount angles 1118 by fastening the mount angle(s), which secure the auxiliary springs 1110, directly to the conveyor's wing plates 1710 with bolts or other similar fasteners.

The electromagnet 1114 may also be selectively coupled to the provided wing plates 1710 in a manner similar to the method of securing the mount angles 1118 to the wing plates. Specifically, the electromagnet 1114 may be mounted within the mounting bracket 1102 as described above, and the mounting bracket 1102 may be configured to bolt directly to wing plates 1710 of a conveyor, for example, such that the electromagnet may be positioned with a predetermined distance and position relative to the drive weights. The mounting bracket may be selectively affixed to the conveyor in a similar manner as the mount angles, wherein the mounting bracket may be secured via the use of screws, bolts, or other suitable fastening mechanisms, devices, or methods.

It will be further appreciated that an electromagnetic drive mechanism 1100 may further comprise, in at least one example, one or more vibrational isolators 1704, a pedestal support structure 1706, and an isolation plate 1708. The vibrational isolators may be configured to provide vibrational isolation to areas or specific components of a conveyor system for example, which may benefit from reduced vibrational motion. As another example, the isolators 1704 may serve to reduce added noise associated with and resultant from prolonged vibration of metal or other solid construction components. In this way, an electromagnetic drive mechanism 1100 may be provided, which may reduce the noise associated with typical electromagnetic drives while maintaining the amount or degree of vibrational motion imparted by the drive mechanism 1100. Additionally or alternatively, the vibrational isolators 1704 may mitigate unwanted or accidental vibrations in undesired directions due to the motion of the conveyor and/or products being conveyed thereon.

The isolation plate 1708, which may optionally include a pedestal support structure 1706, may be provided in at least one example and may be configured to further isolate the vibrational motion imparted by the electromagnetic drive mechanism 1100 to a specific region, such as a region of a trough or pan 1702 of a conveyor system (e.g., conveyor trough 14 of conveyor system 10 of FIG. 1). The isolation plate 1708 may comprise one or more isolators 1704 in direct face-sharing contact with a top surface of the isolation plate relative to a ground surface. The one or more isolators 1704 may further be in direct face-sharing contact with a bottom surface of the electromagnetic drive mechanism 1100 relative to a ground surface. As one example technical effect of providing one or more isolators positioned between an isolator plate 1708 and the electromagnetic drive, is that when the electromagnetic drive mechanism 1100 moves, resulting in the production of vibratory motion, the one or more isolators 1704 may absorb and potentially redirect some of the vibratory motion away from the isolator plate 1708 and the pedestal support structure 1706 such that the support structure 1706 may serve to effectively support the mechanism without resulting in undesirable motion being imparted to the pedestal support. Further, the pedestal support structure 1706 may serve to retain and support elements such as the auxiliary springs 1110 while the electromagnet 1114 may be removed to perform maintenance or replaced, for example.

Figure 11:
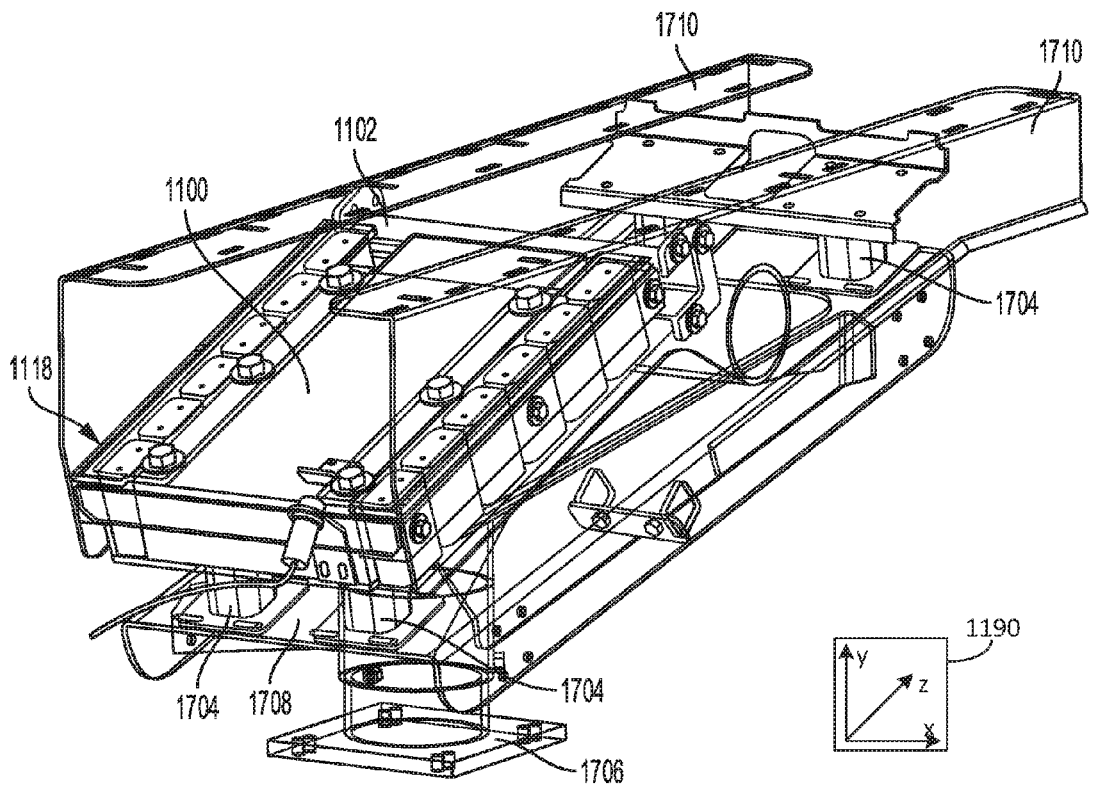
FIG. 11 shows a partial wireframe isometric view illustrating the second electromagnetic drive embodiment coupled to a conveyor.

FIG. 11 provides an alternate view of the above described electromagnetic drive mechanism 1100 coupled to a pair of wing plates 1710 which may correspond to a conveyor system or other vibratory motion utilizing device. In this illustration, two pairs of isolators 1704 are shown. The first isolator pair may be positioned at and may define an interface between the electromagnetic drive mechanism 1100 and the isolator plate 1708 such that the isolators are in direct face-sharing contact at a bottom surface relative to a ground surface with a top surface of the isolation plate 1708 relative to a ground surface, and wherein the isolator pair may be in direct face-sharing contact at a top surface relative to a ground surface with a bottom surface of the electromagnetic drive mechanism relative to a ground surface.

In the example illustrated in FIG. 11, the relative position of the one or more mount angles 1118 may be more clearly visible. As shown, the mount angle may define an interface between a wing plate 1710 and the auxiliary springs of the electromagnetic drive mechanism 1100. In this way, the drive mechanism may be effectively and selectively retained by the wing plates which may correspond to a conveyor system, for example, by using screws, bolts, or other similar fastening devices.

Figure 12:
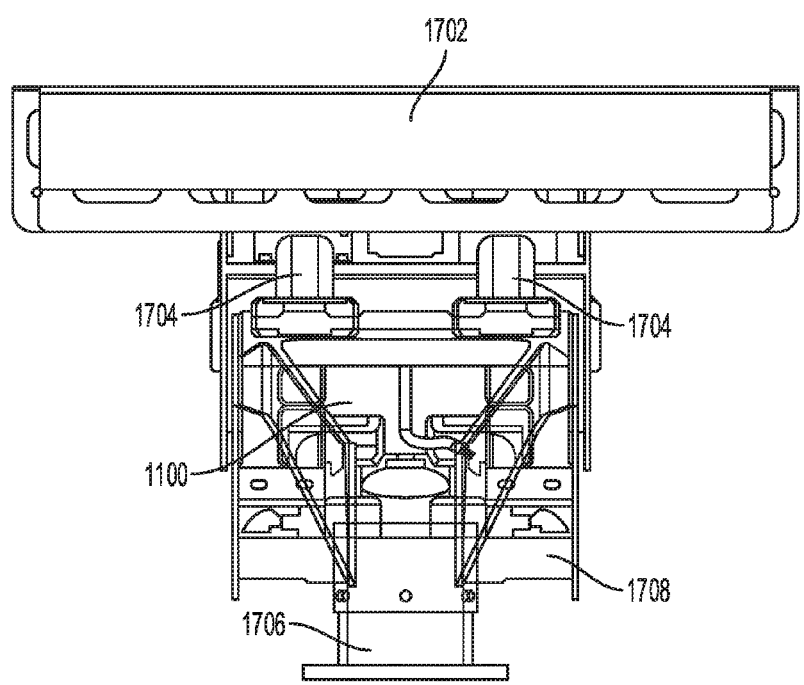
FIG. 12 shows a partial wireframe front profile view of the second electromagnetic drive embodiment coupled to a conveyor.

In FIG. 12, a front view of the electromagnetic drive mechanism 1100 is illustrated as being coupled to an example conveyor trough or pan 1702. The pan may be separated and/or isolated from the drive mechanism 1100 via one or more isolators 1704. The isolators may be configured to redirect vibratory motion away from components that may not fully utilize such motion, and toward components of a conveyor, for example, which may more fully utilize the motion such as the pan 1702. Additionally, the electromagnetic drive mechanism 1100 may be positioned above an isolation plate 1708, which may comprise a pedestal support structure 1706 positioned below said isolation plate 1708.

The electromagnetic drive mechanism 1100 may be separated from the isolation plate 1708 and also the pedestal support structure via the inclusion of one or more isolators 1704, which may define an interface between a top surface of the isolation plate 1708 and a bottom surface of the drive mechanism 1100. Specifically, the isolation plate 1708 may comprise one or more isolators 1704 in direct face-sharing contact with a top surface of the isolation plate relative to a ground surface. The one or more isolators 1704 may further be in direct face-sharing contact with a bottom surface of the electromagnetic drive mechanism 1100 relative to a ground surface.

Figure 13:
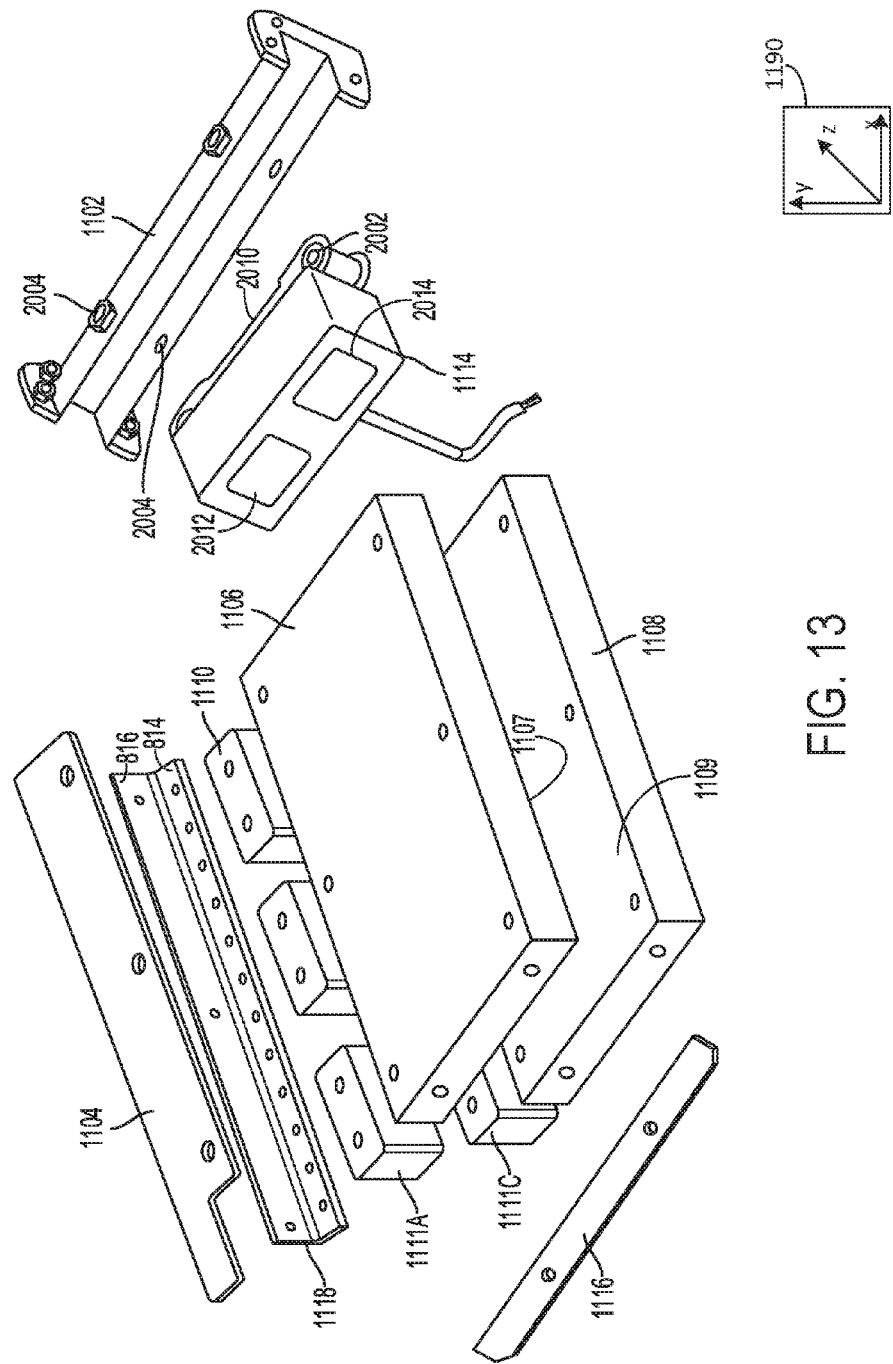
FIG. 13 shows an exploded view of a partially constructed second electromagnetic drive embodiment.

An exploded view of a partially constructed electromagnetic drive according to the second exemplary embodiment is provided in FIG. 13. In this figure, auxiliary springs 1110 are illustrated on only one side for ease of viewing the individual components. It will be appreciated however, that the number of auxiliary springs 1110 used, and the location of said auxiliary springs, may be variable and embodiments are anticipated wherein fewer or more auxiliary springs may be present. Additionally, it will be appreciated that more than one upper clamp plate 1104 may be present in at least one example. Specifically, an upper clamp plate 1104 may correspond to a respective left side and may be positioned in a similar manner as the one shown in FIG. 13 on a respective right side. Further, one or more lower clamp plates 1112 (not shown in FIG. 13) may be provided wherein the lower clamp plates may be positioned below the one or more auxiliary springs on a respective left side and/or a respective right side.

The electromagnet 1114 as illustrated in FIG. 13, as well as the mounting bracket 1102 corresponding to a rear protrusion of the electromagnet, may be more clearly visible. In this view, it may be seen that the electromagnet 1114 may comprise one or more tubular apertures 2002 which may correspond to one or more screw holes 2004 of the mounting bracket 1102. Screws or other similar fastening devices may be used to selectively couple the electromagnet to the mounting bracket.

In this view it may be more clearly visible that the mount angle 1118 may be positioned in a particular manner such that the horizontal protrusion portion may be placed between auxiliary springs 1110, which may correspond to either an upper or lower drive weight. Specifically, the mount angle 1118 may be in direct face sharing contact with one or more auxiliary springs along a lateral face, and may further be in direct face-sharing contact along a medial face relative to the horizontal protrusion portion of the mount angle.

The FIG. 13 further shows a detailed view of each of the mounting bracket 1102, the top clamp plate 1104, the upper drive weight 1106, the lower drive weight 1108, the first group 1111A of springs 1110, the third group 1111C of springs 1110, the coil 1114, the tie plate 1116, a mount angle of the mount angles 1118, and a coil housing 2010.

The coil housing 2010 includes prongs 2012 which may extend through a pair of corresponding openings 2014 arranged within the coil 1114. In one example, the coil 1114 may be forcibly slid along the prongs 2012 until it reaches a body of the coil housing 2010 which comprises a width greater than a width of the coil 1114. As described above, the coil 1114 may slide back and forth along the prongs 2012 based on its energization and deenergization, wherein the coil 1114 slides toward the upper 1106 and lower 1108 drive weights when energized and away from the upper 1106 and lower 1108 drive weights when deenergized. In one example, the body of the coil housing 2010 is shaped similarly to the number "8". The body of the coil housing 2010 may further comprise the tubular apertures 2002 which may correspond to the screw holes 2004 when the coil housing 2010 is arranged within the gap 834 of the mounting bracket 1102. As such, a screw may pass through the screw holes 2004 and fasten through the tubular apertures of the coil housing 2010, thereby fixedly coupling the coil housing 2010 to the mounting bracket 1102. In this way, the mounting bracket 1102 does not directly couple to the coil 1114. Instead, the mounting bracket 1102 directly couples to the coil housing 2010, which comprises prongs 2012 configured to forcibly slide through the coil 1114 and hold the coil 1114 in place.

The upper drive weight 1106 and the lower drive weight 1108 are shown as rectangular prisms. A bottom surface 1107 of the upper drive weight 1106 is in face-sharing contact with a top surface 1109 of the lower drive weight 1108 when the electromagnetic drive mechanism is fully assembled, such as in FIG. 11. When fully assembled, the bottom surface 1107 and the top surface 1109 completely align such that edges of the surface line up.

The springs 1110 of the first group 1111A are shown directly above the springs 1110 of the third group 1111C. The first group 1111A does not contact the third group 1111C. This is accomplished by the inner portion 814 of the mount angle of the mount angles 1118 extending between the first group 1111A and the third group 1111C. This may allow the springs 1110 of the first 1111A and the third 1111C groups to remain in place during conveyor operation while additionally allowing the first group 1111A and the third group 1111C to operate individually of one another. In some examples, the inner portion 814 may also be insulated such that the first group 1111A and the third group 1111C may be thermally insulated from one another. As described above, the springs 1110 are segmented such that each spring in a group (e.g., the first group 1111A) operates independently from other springs within the same group.

Figure 14:
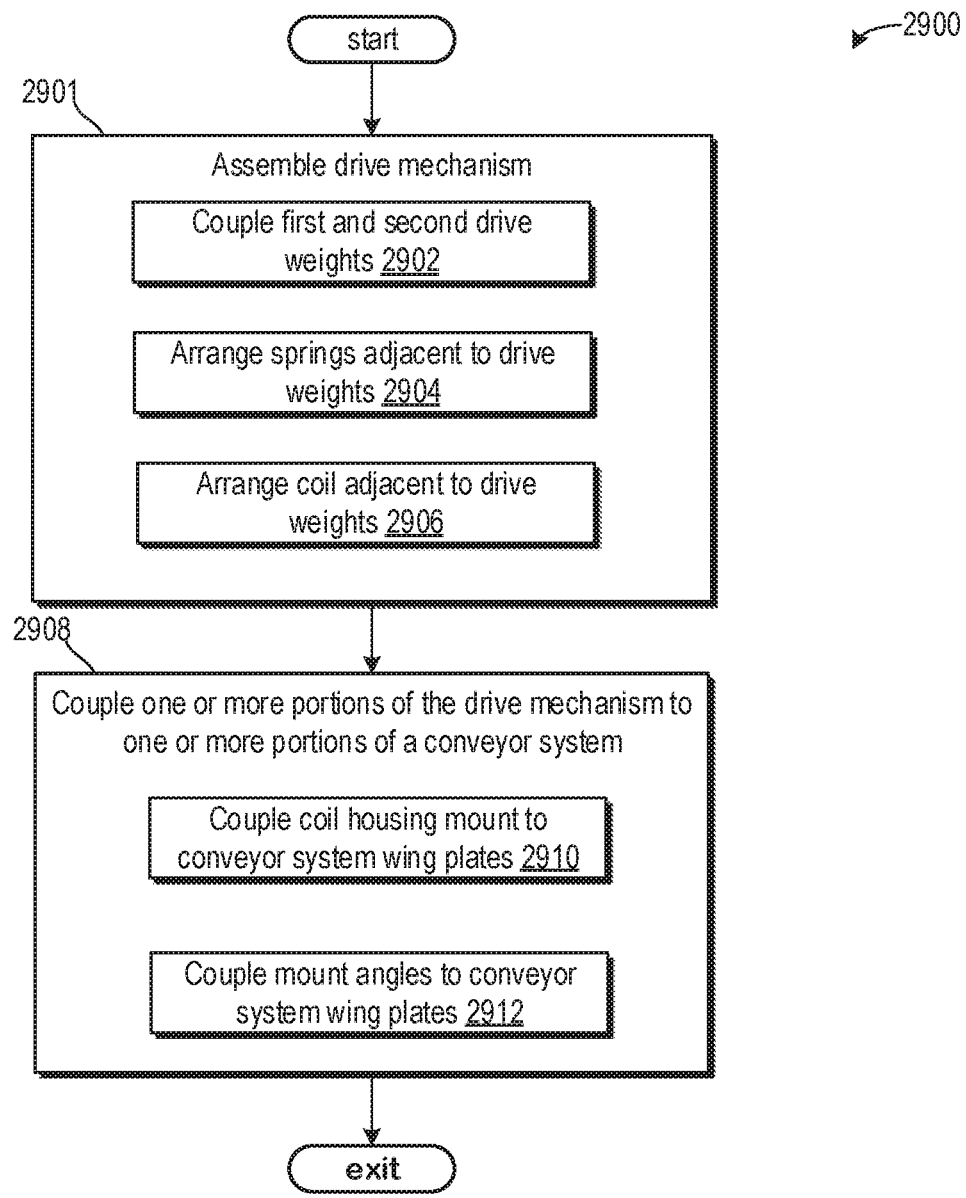
FIG. 14 shows a high-level flow chart for the second electromagnetic drive embodiment.

Turning now to FIG. 14, it shows a high-level flow chart illustrating a method 2900 for assembling an electromagnetic drive mechanism and coupling the electromagnetic drive mechanism to a conveying system. In one example, the method 2900 may be used for assembling the electromagnetic drive mechanism 1100 of FIGS. 4-13 and coupling the electromagnetic drive mechanism 1100 to the conveyor system 10 of FIG. 1.

The method 2900 begins at 2901, where the drive mechanism is assembled. This may include coupling the first and second drive weights at 2902. Coupling the first and second drive weights may be similar to the coupling described above in FIGS. 4 and 8. The assembling may further include arranging the springs adjacent to the drive weights at 2904 and arranging the coil adjacent to the drive weights at 2906. Arranging the springs and the coil adjacent to the drive weights may be substantially similar to arrangement described above at FIGS. 4 and 8.

The method 2900 may proceed to 2908 where the method includes coupling one or more portions of the drive mechanism to one or more portions of the conveyor system. This may include coupling a coil housing mount to conveyor system wing plates at 2910. Coupling the coil housing mount to the wing plates may be similar to the coupling described in FIGS. 4 and 13. The method 2900 may further include coupling the mount angles of the drive mechanism to the conveyor system wing plates. The coupling may be substantially similar to the coupling described in FIGS. 10-12. In one example, the coil housing mount is coupled to a portion of the wing plates nearer to the conveyor trough than the mount angles.

Figure 15:
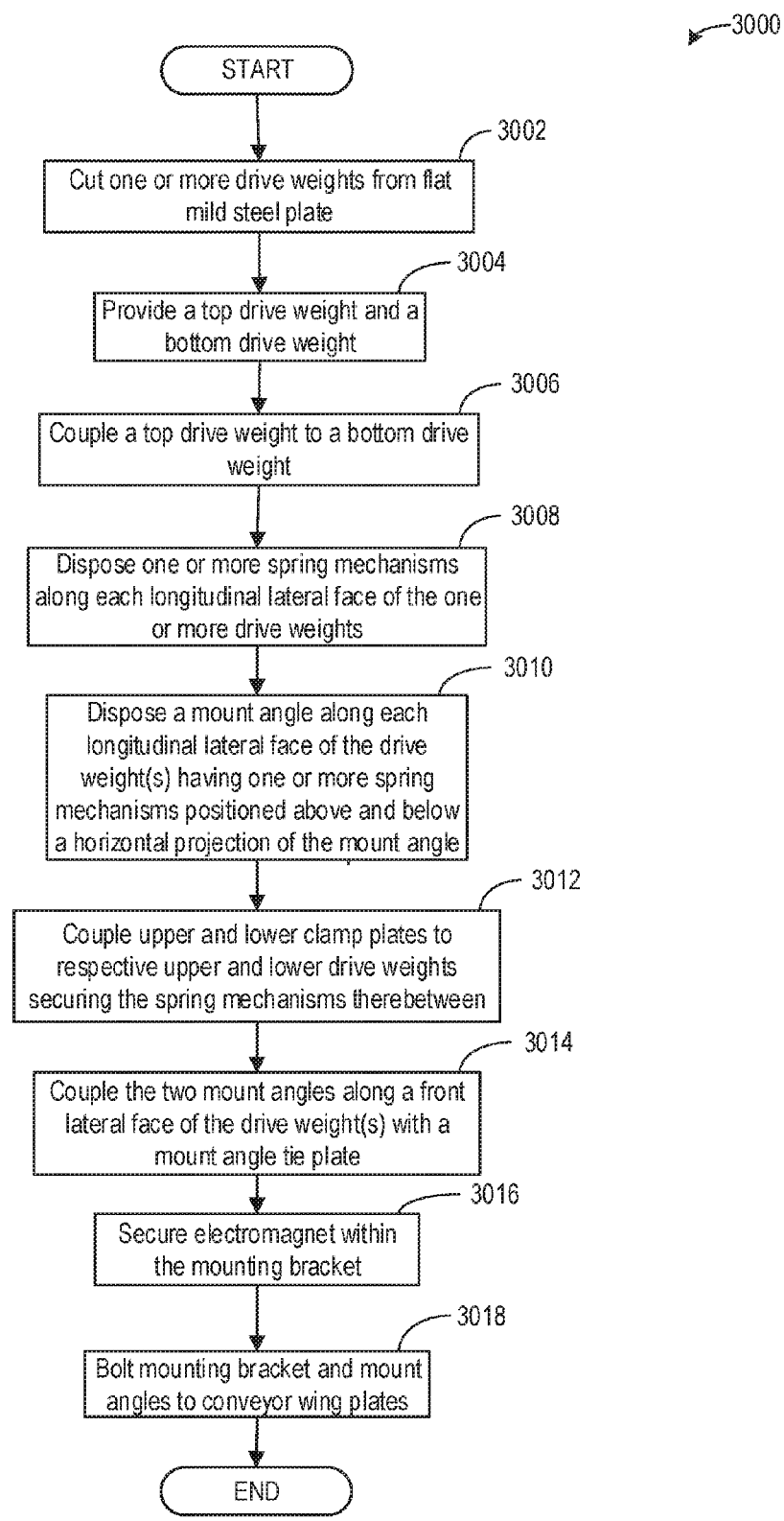
FIG. 15 shows a flowchart detailing an example method for constructing a second electromagnetic drive embodiment.

With respect to FIG. 15, an example method 3000 for construction and installation of the exemplary second embodiment of an electromagnetic drive mechanism is provided. It will be appreciated that the specific steps and/or components listed in the example method are provided solely for exemplary purposes and that the steps listed may be performed in a different order, and the components listed may be adjusted based on the demand faced by the exemplary electromagnetic drive mechanism.

At step 3002, one or more drive weights may be obtained via cutting a shape comprising the desired dimensions from a flat mild steel plate. In at least one example, two drive weights may be provided. In step 3004, two drive weights are provided, one is selected as the top drive weight, and the other is designated as the bottom drive weight. The upper drive weight may be in direct face-sharing contact with the bottom drive weight at an interface between the two plates along a top planar surface of the bottom drive weight and a bottom planar surface of the top drive weight.

At step 3006, the top drive weight may be coupled to a bottom drive weight via the use of bolts or other similar fastening devices and/or mechanisms. Again, the upper drive weight may be in direct-face sharing contact with the bottom drive weight at an interface between two planar surfaces of the plates.

In step 3008, the construction method may proceed by disposing one or more auxiliary springs along each of the two most longitudinal lateral faces of the one or more drive weights. For example, a plurality of auxiliary springs may be disposed along a left longitudinal lateral face of an upper drive weight and/or along a left longitudinal lateral face of a lower drive weight. Additionally, a plurality of auxiliary springs may be positioned along a right longitudinal lateral face of an upper drive weight and/or along a right longitudinal lateral face of a lower drive weight. It will be appreciated that the upper and lower drive weights may comprise a variable number of auxiliary springs positioned along their longitudinal lateral faces depending on the application of the drive mechanism. In one example, a longitudinal lateral face of a rectangular object includes the longer sides of the object, where the sides are opposite and parallel to one another.

The method may continue at step 3010 wherein a mount angle may be disposed along each longitudinal lateral face of the upper and lower drive weights. The mount angle may be configured to retain the one or more auxiliary springs that may be positioned along the longitudinal lateral faces of the drive weights such that one or more auxiliary springs may be positioned above a horizontal projection of the mount angle, and one or more auxiliary springs may be further positioned below said horizontal projection of the mount angle.

At step 3012 the method may continue by coupling a pair of upper clamp plates and a pair of lower clamp plates to their respective upper and lower drive weights. The clamp plates may be coupled to the drive weights along a lesser longitudinal edge such that a major longitudinal edge may be configured to retain the one or more auxiliary springs between an upper clamp plate and a lower clamp plate.

The method may then proceed to step 3014 in which the mount angles corresponding to respective right and left sides may then be coupled to one another and secured via a mount angle tie plate. The mount angle tie plate may be coupled to an upper drive weight via the use of bolts, screws, or other similar fastening devices.

It will be appreciated that steps 3002-3014 may be considered to be steps corresponding to the construction of the body of the electromagnetic drive mechanism. The electromagnet may, in at least one example, be configured such that the electromagnet may be removed from a conveyor system without demanding the adjustment of conveying surfaces or the like from the conveyor system (e.g., the surface 32 of the conveyor trough 14 of FIG. 1). As such, the electromagnetic drive mechanism may be readily accessed by a user without the adjustment or removal of other components associated with the conveyor system. In this way, the electromagnetic drive mechanism may be mounted independently of the conveyor surface of the conveyor system.

At step 3016, the provided electromagnet may be secured within a mounting bracket via the use of bolts, screws, or other similar fastening devices.

The method may then proceed to installation of the electromagnetic drive mechanism as illustrated by step 3018. In step 3018, the mounting bracket within which the electromagnet may be retained, may then be bolted directly to one or more wing plates corresponding to a conveyor system (e.g., wing plates 22 of conveyor system 10 of FIG. 1), for example. Additionally, the mount angles may also be bolted directly to one or more wing plates corresponding to a conveyor system, for example. It will be appreciated that the mounting bracket and mount angles may be bolted independently and at different positions along the wing plate(s) such that the mounting bracket and/or the mount angles may be removed independently of each other.

In this way, an electromagnetic drive mechanism having a plurality of mounts configured to individually mount each of a plurality of springs, upper and lower drive weights, and a coil is disclosed. The technical effect of individually mounting each of the above described components may enable a user to quickly and easily access components of the electromagnetic drive mechanism without removing other components of the drive mechanism or adjusting a conveyor trough and/or conveyor pan. By doing this, a cost of accessing the electromagnetic drive mechanism is reduced due to fewer users being needed to remove parts and time is saved.

A first embodiment of an electromagnetic drive mechanism comprising a first drive weight aligned with and in face-sharing contact with a second drive weight, a top clamp and a bottom clamp fixedly coupling the first and second drive weights together, springs arranged alongside the first and second drive weights, a tie plate coupling the springs to the first and second drive weights, and a coil slidably mounted on a coil housing, the coil being configured to oscillate between the coil housing and the first and second drive weights. A first example of the electromagnetic drive mechanism further includes where the tie plate is arranged on a first lateral side of the electromagnetic drive mechanism, the coil housing is arranged adjacent to a second lateral side of the electromagnetic drive mechanism, and where a first group of springs of the springs are arranged adjacent to a first longitudinal side of the electromagnetic drive mechanism and where a second group of springs of the springs are arranged adjacent to a second longitudinal side of the electromagnetic drive mechanism, where the first and second lateral sides are opposite one another and where the first and second longitudinal sides are opposite one another, the first and second lateral sides being perpendicular to the first and second longitudinal sides. A second example of the electromagnetic drive mechanism, optionally including the first example, further includes where the first group of springs is physically coupled to a first mount angle of the mount angles and where the second group of springs is physically coupled to a second mount angle of the mount angles, where each mount angle of the mount angles comprises an L-shaped cross-section. A third example of the electromagnetic drive mechanism, optionally including the first and/or second examples, further includes where the tie plate is coupled to at least the first and second mount angles of the mount angles and physically coupled to at least one of the first and second drive weights. A fourth example of the electromagnetic drive mechanism, optionally including one or more of the first through third examples, further includes where the first group of springs and the second group of springs comprises a plurality of segmented springs where each spring of the springs is arranged along a common axis parallel to a longitudinal axis electromagnetic drive mechanism, and where the first group of springs is divided into a first upper group and a first lower group relative to an arrangement of the first group of springs on the first mount angle, and where the first upper group comprises five springs arranged directly above five springs of the first lower group, and where the second group of springs is divided into a second upper group and a second lower group relative to an arrangement of the second group of springs on the second mount angle, and where the second upper group comprises five springs arranged directly above five springs of the second lower group, the first upper group and the second upper group of springs being separated and arranged on opposite sides of the first drive weight, and the first lower group and the second lower group of springs being separated and arranged on opposite sides of the second drive weight. A fifth example of the electromagnetic drive mechanism, optionally including one or more of the first through fourth examples, further includes where the springs are configured to be accessed via loosening the first mount angle, and where the accessing does not include adjusting a mounting of the drive weight or the coil. A sixth example of the electromagnetic drive mechanism, optionally including one or more of the first through fifth examples, further includes where the coil housing is physically coupled to a coil housing mount, where the coil housing mount and the mount angles are configured to be angularly mounted relative to a surface of a conveyor to one or more moveable portions of a conveyor system including the conveyor, and where oscillation of the coil is translated into linear motion of the conveyor. A seventh example of the electromagnetic drive mechanism, optionally including one or more of the first through sixth examples, further includes where the coil moves toward the first and second drive weights and away from the coil housing when the coil is energized, and where the coil moves away from the first and second drive weights and toward the coil housing when the coil is de-energized. An eighth example of the electromagnetic drive mechanism, optionally including one or more of the first through seventh examples, further includes where the first drive weight and the second drive weight are stationary and do not move during an oscillation of the coil. A ninth example of the electromagnetic drive mechanism, optionally including one or more of the first through eighth examples, further includes where the first drive weight and the second drive weight are configured to be accessed via loosening one or more of the upper and lower clamp plates and the tie plate, and where the accessing does not include adjusting a mounting of the springs and the coil.

An embodiment of a method comprising assembling an electromagnetic drive mechanism including coupling a first drive weight to a second drive weight, arranging springs adjacent to the drive weights, and arranging a coil adjacent to the drive weights, and coupling one or more portions of the electromagnetic drive mechanism to one or more portions of a conveying system including coupling a coil housing mount to first and second wing plates of the conveying system and coupling mount angles to first and second wing plates of the conveying system, where the first and second wing plates are physically coupled to a conveyor trough of the conveying system. A first example of the method further includes where first drive weight and the second drive weight are centrally aligned and symmetric, the first drive weight and the second drive weight being physically coupled to one another, further comprising an upper clamp plate being physically coupled to the first drive weight and a lower clamp plate being physically coupled to the second drive weight, and where one or more fasteners extends through an entire height of the upper clamp plate, the first drive weight, the second drive weight, and the lower clamp plate. A second example of the method, optionally including the first example, further includes where the springs further comprise a first group of springs arranged adjacent to a first longitudinal side of the first and second drive weights and a second groups of springs arranged adjacent to a second longitudinal side of the first and second drive weights, the first and second groups of springs being mounted via a first mount angle and a second mount angle, respectively, the first mount angle being physically coupled to the first wing plate and the second mount angle being physically coupled to the second wing plate, the coil further comprising a coil housing to which the coil is slidably coupled, the coil housing being physically coupled to the coil housing mount, where fasteners extending through each of the coil housing and the coil housing mount are spaced away from the coil, and actuating the coil to and away from the drive weights by energizing and deenergizing the coil, the coil housing mount configured to impart motion of the coil to the conveyor trough via the wing plates, and where the springs actuate with the actuating of the coil, the mount angles being configured to impart motion of the springs to the conveyor trough via the wing plates.

An embodiment of a conveyor system comprising a conveyor trough comprising a surface upon which items are to be conveyed from an upstream lateral end toward a downstream lateral end, where the upstream and downstream lateral ends are opposite one another along a longitudinal axis of the surface, two or more wing plates arranged along opposite longitudinal sides of the conveyor trough, where the longitudinal sides are arranged between the upstream and downstream lateral ends, where the wing plates and the conveyor trough are moveably mounted onto a conveyor base, the conveyor base resting upon a ground such that the surface faces a direction opposite a direction of gravity, a drive mechanism comprising one or more mount angles and a coil housing mount, where a first mount angle of the mount angles, arranged on a first longitudinal side of the drive mechanism, is coupled to a first wing plate of the wing plates and a second mount angle of the mount angles, arranged on a second longitudinal side of the drive mechanism, is coupled to a second wing plate of the wing plates, and where the coil housing mount is coupled to each of the conveyor trough, the first wing plate, and the second wing plate, where the first and second longitudinal sides are opposite one another and parallel to the longitudinal axis, and two or more drive weights mounted within the drive mechanism, the drive weights being fixedly coupled to a tie plate at a first lateral side of the drive mechanism, the drive weights spaced away from a coil at a second lateral side of the drive mechanism, where the first lateral side and the second lateral side are opposite one another and perpendicular to the longitudinal axis, a first plurality of springs arranged adjacent to the drive weights at the first longitudinal side of the drive mechanism via the first mount angle and a second plurality of springs arranged adjacent to the drive weights at the second longitudinal side of the drive mechanism via the second mount angle and where each of the drive weights, coil, and springs is mounted independently of one another within the drive mechanism. A first example of the conveyor system further includes where the coil is slidably mounted onto a coil housing via prongs extending from the coil housing through a pair of openings in the coil, and where the coil is configured to be energized and deenergized, where the coil is attracted to and slides towards the drive weights when energized and where the coil is repulsed by and slides away from the drive weights when deenergized, and where energizing and deenergizing the coil translates into motion of the conveyor trough. A second example of the conveyor system, optionally including the first example, further includes where the drive weights are physically coupled to only a top clamp plate, a bottom clamp plate, and the tie plate, where the top clamp plate and the bottom clamp plate are arranged on top and bottom surfaces of the drive mechanism, and where the first plurality of springs is physically coupled to only the first mount angle and the second plurality of springs is physically coupled to only the second mount angle, and where the coil is slidably coupled to a coil housing, the coil housing being fixedly coupled to only the coil housing mount. A third example of the conveyor system, optionally including the first and/or second examples, further includes where the first mount angle and the second mount angle comprise an L-shaped cross-section, the first mount angle comprising a first outer portion extending along a plane parallel to the first longitudinal side and a first inner portion extending from the first longitudinal side to a central axis of the drive mechanism, the second mount angle comprising a second outer portion extending along a plane parallel to the second longitudinal side and a second inner portion extending from the second longitudinal side to the central axis of the drive mechanism, and where the first plurality of springs comprises first upper springs sitting atop the first inner portion and first lower springs arranged below the first inner portion, and where the second plurality of springs comprises second upper springs sitting atop the second inner portion and the second lower springs arranged below the second inner portion. A fourth example of the conveyor system, optionally including one or more of the first through third examples, further includes where the first upper springs and the first lower springs are arranged along a first common axis parallel to the central axis of the drive mechanism, the first upper springs being arranged directly above the first lower springs, and where the second upper springs and second lower springs are arranged along a second common axis parallel to the central axis and the first common axis, the second upper springs being arranged directly above the second lower springs and directly lateral to the first upper springs. A fifth example of the conveyor system, optionally including one or more of the first through fourth examples, further includes where the drive weights comprise an upper drive weight and a lower drive weight, the upper drive weight and the lower drive weight are aligned and in face-sharing contact, the upper drive weight being arranged between the first upper springs and the second upper springs, and the lower drive weight being arranged between the first lower springs and the second lower springs. A sixth example of the conveyor system, optionally including one or more of the first through fifth examples, further includes where the drive weights are configured to be accessed without unmounting the springs and coil, and where the springs are configured to be accessed without unmounting the drive weights and coil, and where the coil is configured to be accessed without unmounting the drive weights and the springs, and where each of the drive weights, springs, and coil is configured to be accessed without removing the conveyor trough.

In another representation, an electromagnetic drive for use in generating vibratory motion comprising a center plate having detachable, self-contained auxiliary spring elements removably mounted thereto. Further comprising one or more inner drive weights disposed on the center plate, an electromagnet coupled to a mounting bracket disposed on the center plate, and one or more bolt rings fixedly attached to the one or more constant springs. The center plate comprises one or more curvilinear projections. Further comprising an upper constant spring and the lower constant spring comprise elastomeric frames. Additionally or alternatively, the drive mechanism may further comprise one or more auxiliary spring elements are disposed along a top face of the center plate relative to a ground surface. The center plate comprises two curvilinear projections positioned along a front and rear edge of the electromagnetic drive. The two curvilinear projections are used to retain the electromagnetic drive within a vibratory motion utilizing device, wherein two drive weights are provided, wherein a first drive weight is coupled to a top planar surface of the center plate relative to a ground surface and a second drive weight is coupled to a bottom planar surface of the center plate relative to a ground surface.

In another further representation an electromagnetic drive for use in generating vibratory motion comprising a coil mounted at one end of the drive, a plurality of auxiliary spring elements mounted along two side edge perimeters of the drive, a centrally positioned drive weight, clamp plates to enable the auxiliary springs to be removed without removing the drive from the conveyer, the clamp plates tying the auxiliary springs to the drive weight, the auxiliary springs placed beside the drive weight. Further comprising a coil mount bracket for mounting the coil into a conveyor pan, wherein the coil is mounted so that it is removable without removing the pan or drive, the drive further comprising an angled bracket providing a connection between the conveyor and auxiliary springs and integrating the drive into the conveyor pan.

In an additional representation, an electromagnetic drive mechanism for use in imparting vibratory motion to a host member, the drive comprising one or more drive weights defining a body of the electromagnetic drive mechanism, one or more upper clamp plates selectively retaining a top face of the one or more drive weights, one or more lower clamp plates selectively coupled to a bottom face of the one or more drive weights, one or more auxiliary springs disposed along one or more lateral longitudinal faces of the one or more drive weights, wherein the one or more auxiliary springs are retained between an upper clamp plate and a lower clamp plate, one or more mount angles selectively retaining the one or more auxiliary springs along a lateral face thereof, a mount angle tie bar releasably coupled to an anterior lateral face of the one or more drive weights, an electromagnet releasably coupled to the one or more auxiliary springs at a posterior lateral face, and a mounting bracket that selectively retains the electromagnet at a posterior lateral face. The mechanism further comprises an isolation plate, one or more isolators, and a pedestal support structure and/or wherein the one or more drive weights comprise a center of mass located at the dead center of the one or more drive weights. The electromagnetic drive mechanism comprises two drive weights. The number of the one or more auxiliary springs is adjusted to control operating frequency. The one or more mount angles integrate the drive mechanism into the pan of a conveyor system. The electromagnet is removable without removing the drive mechanism or the pan of a conveyor system.

In a another additional representation, an auxiliary spring for use with electromagnetic drive devices comprising two or more springs comprising a laminated structure, at least one elastomeric block between one or more non-elastomeric blocks, wherein the elastomeric blocks are separated from one another by a non-elastomeric block, at least one intermediate block supported between the two or more springs, and at least one elastomeric bumper bonded to one or more side faces of the intermediate block. The at least one non-elastomeric block located between the one or more elastomeric blocks further comprises elastomeric surfaces fixedly attached to two opposing sides thereof. Further comprising a housing wherein the two or more springs, the at least one elastomeric block, the at least one intermediate block, and the at least one elastomeric bumper are disposed therein. The auxiliary spring comprises a modular construction.

In another representation, additionally or alternatively, a support pedestal for use with an electromagnetic drive mechanism comprises, an isolation plate, a plurality of vibrational isolators coupled to an electromagnetic drive configured to absorb and direct vibrations away from the isolation plate, an adjustable arm, and a support foot which contacts a ground surface. The vibrational isolators comprise elastomeric materials. The pedestal is selectively coupled to a conveyor system. The adjustable arm is movable about a horizontal axis.

The geometries, orientations, shapes, and relative dimensions have been presented and illustrated herein in simplified form. It will be appreciated that other geometries, orientations, shapes, and relative dimensions are anticipated. As this disclosure may be embodied in several forms without departing from the spirit of essential characteristics thereof, the present embodiments are therefore illustrative and not restrictive, since the scope of the disclosure is defined by the appended claims rather than by the description preceding them, and all changes that fall within metes and bounds of the claims, or equivalence of such metes and bounds thereof, are therefore intended to be embraced by the claims.

Thus, it should be appreciated that the figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be further appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and sub-combinations of the various features, functions, acts, and/or properties disclosed herein, as well as any and all equivalents thereof. The following claims particularly point out certain combinations and sub-combinations regarded as novel and nonobvious. These claims may refer to "an" element or "a first" element or the equivalent therefor. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An electromagnetic drive mechanism comprising:
   a first drive weight aligned with and in face-sharing contact with a second drive weight;
   a top clamp and a bottom clamp fixedly coupling the first and second drive weights together;
   springs arranged alongside the first and second drive weights;
   a tie plate coupling the springs to the first and second drive weights; and
   a coil slidably mounted on a coil housing, the coil being configured to oscillate between the coil housing and the first and second drive weights.

2. The electromagnetic drive mechanism of claim 1, wherein the tie plate is arranged on a first lateral side of the electromagnetic drive mechanism, the coil housing is arranged adjacent to a second lateral side of the electromagnetic drive mechanism, and where a first group of springs are arranged adjacent to a first longitudinal side of the electromagnetic drive mechanism and where a second group of springs are arranged adjacent to a second longitudinal side of the electromagnetic drive mechanism, where the first and second lateral sides are opposite one another and where the first and second longitudinal sides are opposite one another, the first and second lateral sides being perpendicular to the first and second longitudinal sides.

3. The electromagnetic drive mechanism of claim 2, wherein the first group of springs is physically coupled to a first mount angle and where the second group of springs is physically coupled to a second mount angle, where each mount angle of the mount angles comprises an L-shaped cross-section.

4. The electromagnetic drive mechanism of claim 3, wherein the tie plate is coupled to at least the first and second mount angles and physically coupled to at least one of the first and second drive weights.

5. The electromagnetic drive mechanism of claim 3, wherein the first group of springs and the second group of springs comprise a plurality of segmented springs where each spring is arranged along a common axis parallel to a longitudinal axis electromagnetic drive mechanism, and where the first group of springs is divided into a first upper group and a first lower group relative to an arrangement of the first group of springs on the first mount angle, and where the first upper group comprises five springs arranged directly above five springs of the first lower group, and where the second group of springs is divided into a second upper group and a second lower group relative to an arrangement of the second group of springs on the second mount angle, and where the second upper group comprises five springs arranged directly above five springs of the second lower group, the first upper group and the second upper group of springs being separated and arranged on opposite sides of the first drive weight, and the first lower group and the second lower group of springs being separated and arranged on opposite sides of the second drive weight.

6. The electromagnetic drive mechanism of claim 3, wherein the springs are configured to be accessed via loosening the first mount angle, and where the accessing does not include adjusting a mounting of the drive weights or the coil.

7. The electromagnetic drive mechanism of claim 1, wherein the coil housing is physically coupled to a coil housing mount, where the coil housing mount and mount angles are configured to be angularly mounted relative to a surface of a conveyor to one or more moveable portions of a conveyor system including the conveyor, and where oscillation of the coil is translated into linear motion of the conveyor.

8. The electromagnetic drive mechanism of claim 1, wherein the coil moves toward the first and second drive weights and away from the coil housing when the coil is energized, and where the coil moves away from the first and second drive weights and toward the coil housing when the coil is de-energized.

9. The electromagnetic drive mechanism of claim 8, wherein the first drive weight and the second drive weight are stationary and do not move during an oscillation of the coil.

10. The electromagnetic drive mechanism of claim 1, wherein the first drive weight and the second drive weight are configured to be accessed via loosening one or more of the top and bottom clamp plates and the tie plate, and where the accessing does not include adjusting a mounting of the springs and the coil.

11. A method comprising:
assembling an electromagnetic drive mechanism including coupling a first drive weight to a second drive weight, arranging springs adjacent to the drive weights, and arranging a coil adjacent to the drive weights, and where the coil is mounted on a coil housing and configured to move to and away from the drive weights; and
coupling one or more portions of the electromagnetic drive mechanism to one or more portions of a conveying system including coupling a coil housing mount to first and second wing plates of the conveying system and coupling mount angles to the first and second wing plates of the conveying system, where the first and second wing plates are physically coupled to a conveyor trough of the conveying system, the coil housing being physically coupled to the coil housing mount, and where the first drive weight and the second drive weight are centrally aligned and symmetric, the first drive weight and the second drive weight being physically coupled to one another, further comprising an upper clamp plate being physically coupled to the first drive weight and a lower clamp plate being physically coupled to the second drive weight, and where one or more fasteners extend through an entire height of the upper clamp plate, the first drive weight, the second drive weight, and the lower clamp plate.

12. The method of claim 11, wherein the springs further comprise a first group of springs arranged adjacent to a first longitudinal side of the first and second drive weights and a second group of springs arranged adjacent to a second longitudinal side of the first and second drive weights, the first and second groups of springs being mounted via a first mount angle and a second mount angle, respectively, the first mount angle being physically coupled to the first wing plate and the second mount angle being physically coupled to the second wing plate;
further comprising where the coil is slidably coupled to the coil housing where fasteners extending through each of the coil housing and the coil housing mount are spaced away from the coil; and
actuating the coil to and away from the drive weights by energizing and deenergizing the coil, the coil housing mount configured to impart motion of the coil to the conveyor trough via the wing plates, and where the springs actuate with the actuating of the coil, the mount angles being configured to impart motion of the springs to the conveyor trough via the wing plates.

13. A conveyor system comprising:
a conveyor trough comprising a surface upon which items are to be conveyed from an upstream lateral end toward a downstream lateral end, where the upstream and downstream lateral ends are opposite one another along a longitudinal axis of the surface;
two or more wing plates arranged along opposite longitudinal sides of the conveyor trough, where the longitudinal sides are arranged between the upstream and downstream lateral ends, where the wing plates and the conveyor trough are moveably mounted onto a conveyor base, the conveyor base resting upon a ground such that the surface faces a direction opposite a direction of gravity;
a drive mechanism comprising one or more mount angles and a coil housing mount, where a first mount angle, arranged on a first longitudinal side of the drive mechanism, is coupled to a first wing plate and a second mount angle, arranged on a second longitudinal side of the drive mechanism, is coupled to a second wing plate, and where the coil housing mount is coupled to each of the conveyor trough, the first wing plate, and the second wing plate, where the first and second longitudinal sides are opposite one another and parallel to the longitudinal axis; and
two or more drive weights mounted within the drive mechanism, the drive weights being fixedly coupled to a tie plate at a first lateral side of the drive mechanism, the drive weights spaced away from a coil at a second lateral side of the drive mechanism, where the first lateral side and the second lateral side are opposite one another and perpendicular to the longitudinal axis, a first plurality of springs arranged adjacent to the drive weights at the first longitudinal side of the drive mechanism via the first mount angle and a second plurality of springs arranged adjacent to the drive weights at the second longitudinal side of the drive mechanism via the second mount angle and where each of the drive weights, the coil, and the springs are mounted independently of one another within the drive mechanism.

14. The conveyor system of claim 13, wherein the coil is slidably mounted onto a coil housing via prongs extending from the coil housing through a pair of openings in the coil, and where the coil is configured to be energized and deenergized, where the coil is attracted to and slides towards the drive weights when energized and where the coil is repulsed by and slides away from the drive weights when deenergized, and where energizing and deenergizing the coil translates into motion of the conveyor trough.

15. The conveyor system of claim 13, wherein the drive weights are physically coupled to only a top clamp plate, a bottom clamp plate, and the tie plate, where the top clamp plate and the bottom clamp plate are arranged on top and bottom surfaces of the drive mechanism, and where the first plurality of springs is physically coupled to only the first mount angle and the second plurality of springs is physically coupled to only the second mount angle, and where the coil is slidably coupled to a coil housing, the coil housing being fixedly coupled to only the coil housing mount.

16. The conveyor system of claim 13, wherein the first mount angle and the second mount angle comprise an L-shaped cross-section, the first mount angle comprising a first outer portion extending along a plane parallel to the first longitudinal side and a first inner portion extending from the first longitudinal side to a central axis of the drive mechanism, the second mount angle comprising a second outer portion extending along a plane parallel to the second longitudinal side and a second inner portion extending from the second longitudinal side to a central axis of the drive mechanism, and where the first plurality of springs comprises first upper springs sitting atop the first inner portion and first lower springs arranged below the first inner portion, and where the second plurality of springs comprises second upper springs sitting atop the second inner portion and second lower springs arranged below the second inner portion.

17. The conveyor system of claim 16, wherein the first upper springs and the first lower springs are arranged along a first common axis parallel to the central axis of the drive mechanism, the first upper springs being arranged directly above the first lower springs, and where the second upper springs and the second lower springs are arranged along a second common axis parallel to the central axis and the first common axis, the second upper springs being arranged directly above the second lower springs and directly lateral to the first upper springs.

18. The conveyor system of claim 17, wherein the drive weights comprise an upper drive weight and a lower drive weight, the upper drive weight and the lower drive weight are aligned and in face-sharing contact, the upper drive weight being arranged between the first upper springs and the second upper springs, and the lower drive weight being arranged between the first lower springs and the second lower springs.

19. The conveyor system of claim 13, wherein the drive weights are configured to be accessed without unmounting the springs and the coil, and where the springs are configured to be accessed without unmounting the drive weights and the coil, and where the coil is configured to be accessed without unmounting the drive weights and the springs, and where each of the drive weights, the springs, and the coil is configured to be accessed without removing the conveyor trough.

* * * * *